US011726578B1

(12) United States Patent
Fashimpaur et al.

(10) Patent No.: US 11,726,578 B1
(45) Date of Patent: Aug. 15, 2023

(54) SCROLLING AND NAVIGATION IN VIRTUAL REALITY

(71) Applicant: Meta Platforms Technologies, LLC, Menlo Park, CA (US)

(72) Inventors: Jacqueline Fashimpaur, Redmond, WA (US); Aakar Gupta, Redmond, WA (US); Tanya Renee Jonker, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/670,228

(22) Filed: Feb. 11, 2022

(51) Int. Cl.
*G06F 3/01* (2006.01)
*G06F 1/16* (2006.01)
*G06F 3/0485* (2022.01)
*G06T 19/00* (2011.01)
*G06F 3/04815* (2022.01)

(52) U.S. Cl.
CPC .............. *G06F 3/017* (2013.01); *G06F 1/163* (2013.01); *G06F 3/011* (2013.01); *G06F 3/0485* (2013.01); *G06F 3/04815* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 10,402,081 B1* | 9/2019 | Andersen | G06F 3/0425 |
| 2010/0125815 A1* | 5/2010 | Wang | G06F 3/017 |
| | | | 715/863 |
| 2015/0261318 A1* | 9/2015 | Scavezze | G06F 3/017 |
| | | | 345/158 |
| 2017/0308118 A1* | 10/2017 | Ito | G06F 1/163 |
| 2019/0163266 A1* | 5/2019 | Johnson | G06F 3/014 |

* cited by examiner

*Primary Examiner* — Stella Higgs
(74) *Attorney, Agent, or Firm* — McDermott Will & Emery LLP

(57) ABSTRACT

Various aspects of the subject technology relate to systems, methods, and machine-readable media for navigating through a shared artificial reality environment. Various aspects may include receiving an indication of a virtual object in the shared artificial reality environment. Aspects may also include receiving an input gesture indicative of a navigation command associated with the virtual object. Aspects may also include determining at least one type of the input gesture comprising flexion and extension, pronation and supination, or radial and ulnar. Aspects may also include determining a control method. Aspects may include determining a scrolling parameter. Aspects may include identifying the navigation command based on the type of the input gesture, the control method, and the scrolling parameter. Aspects may include applying the navigation command to the virtual object.

20 Claims, 11 Drawing Sheets

SCROLLING AND NAVIGATION IN VIRTUAL REALITY

TECHNICAL FIELD

The present disclosure generally relates to navigation and scrolling for computer generated shared artificial reality environments, and more particularly to user scrolling through scrollable lists of virtual objects in such environments.

BACKGROUND

Interaction in a computer generated shared artificial reality environment involves interaction with various types of artificial reality/virtual content, elements, and/or applications in the shared artificial reality environment. Users of the shared artificial reality environment may desire to select between options presented in the shared artificial reality environment. For example, a virtual object in the environment can include a scrollable list. An ability to naturally scroll through the scrollable list and browse through content with natural hand gestures in the shared artificial reality environment may enhance the user experience with respect to user movement for controlling scrolling and navigation in the environment.

BRIEF SUMMARY

The subject disclosure provides for systems and methods for navigation through an artificial reality environment such as a shared virtual reality environment such as scrolling through virtual areas or objects. For example, users of the shared virtual reality environment may use movements to scroll through a scrollable list of a particular virtual object or area. The movements can be wrist movements or other suitable movements. That is, users can move their wrists via a midair scrolling technique that may be reflected by a virtual representation of a hand in the environment, for example. Various wrist movements may correspond to different provided types of input gestures, such as flexion and extension, pronation and supination, radial and ulnar, etc. A method of scrolling may be performed based on selected wrist movements which define a navigation command according to one or more control methods and/or scrolling parameters (e.g., a transfer function to simulate momentum when scrolling via input gestures). The various mechanisms for scrolling and/or navigation in the environment of the present disclosure may improve scrolling or navigation through virtual content, such as by providing more natural and intuitive scrolling techniques. Accordingly, users advantageously may experience improved virtual interface(s) for navigation in artificial reality environments.

According to one embodiment of the present disclosure, a computer-implemented method for navigating through a shared artificial reality environment is provided. The method includes determining receiving an indication of a virtual object in the shared artificial reality environment. The method also includes receiving, via a virtual interface, an input gesture indicative of a navigation command associated with the virtual object. The method also includes determining at least one type of the input gesture. The type of the input gesture comprises at least one of: flexion and extension, pronation and supination, or radial and ulnar. The method also includes determining a control method. The method also includes determining a scrolling parameter. The method also includes identifying the navigation command based on the type of the input gesture, the control method, and the scrolling parameter. The method includes applying the navigation command to the virtual object.

According to one embodiment of the present disclosure, a system is provided including a processor and a memory comprising instructions stored thereon, which when executed by the processor, causes the processor to perform a method for navigating through a shared artificial reality environment. The method includes determining receiving an indication of a virtual object in the shared artificial reality environment. The method also includes receiving, via a virtual interface, an input gesture indicative of a navigation command associated with the virtual object. The method also includes determining at least one type of the input gesture. The type of the input gesture comprises at least one of: flexion and extension, pronation and supination, or radial and ulnar. The method also includes determining a control method. The method also includes determining a scrolling parameter. The method also includes identifying the navigation command based on the type of the input gesture, the control method, and the scrolling parameter. The method includes applying the navigation command to the virtual object.

According to one embodiment of the present disclosure, a non-transitory computer-readable storage medium is provided including instructions (e.g., stored sequences of instructions) that, when executed by a processor, cause the processor to perform a method for navigating through a shared artificial reality environment. The method includes determining receiving an indication of a virtual object in the shared artificial reality environment. The method also includes receiving, via a virtual interface, an input gesture indicative of a navigation command associated with the virtual object. The method also includes determining at least one type of the input gesture. The type of the input gesture comprises at least one of: flexion and extension, pronation and supination, or radial and ulnar. The method also includes determining a control method. The method also includes determining a scrolling parameter. The method also includes identifying the navigation command based on the type of the input gesture, the control method, and the scrolling parameter. The method includes applying the navigation command to the virtual object.

According to one embodiment of the present disclosure, a non-transitory computer-readable storage medium is provided including instructions (e.g., stored sequences of instructions) that, when executed by a processor, cause the processor to perform a method for navigating through a shared artificial reality environment. The method includes determining receiving an indication of a virtual object in the shared artificial reality environment. The method also includes receiving, via a virtual interface, an input gesture indicative of a navigation command associated with the virtual object. The method also includes determining at least one type of the input gesture. The type of the input gesture comprises at least one of: flexion and extension, pronation and supination, or radial and ulnar. The method also includes determining a control method. The method also includes determining a scrolling parameter. The method also includes generating, based on the scrolling parameter, a momentum of scrolling through a scrollable list of the virtual object in the shared artificial reality environment according to the input gesture. The method also includes identifying the navigation command based on the type of the input gesture, the control method, and the scrolling parameter. The method includes applying the navigation command to the virtual object. The method includes selecting an item of the scrollable list based on the navigation command and a double pinch input gesture.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
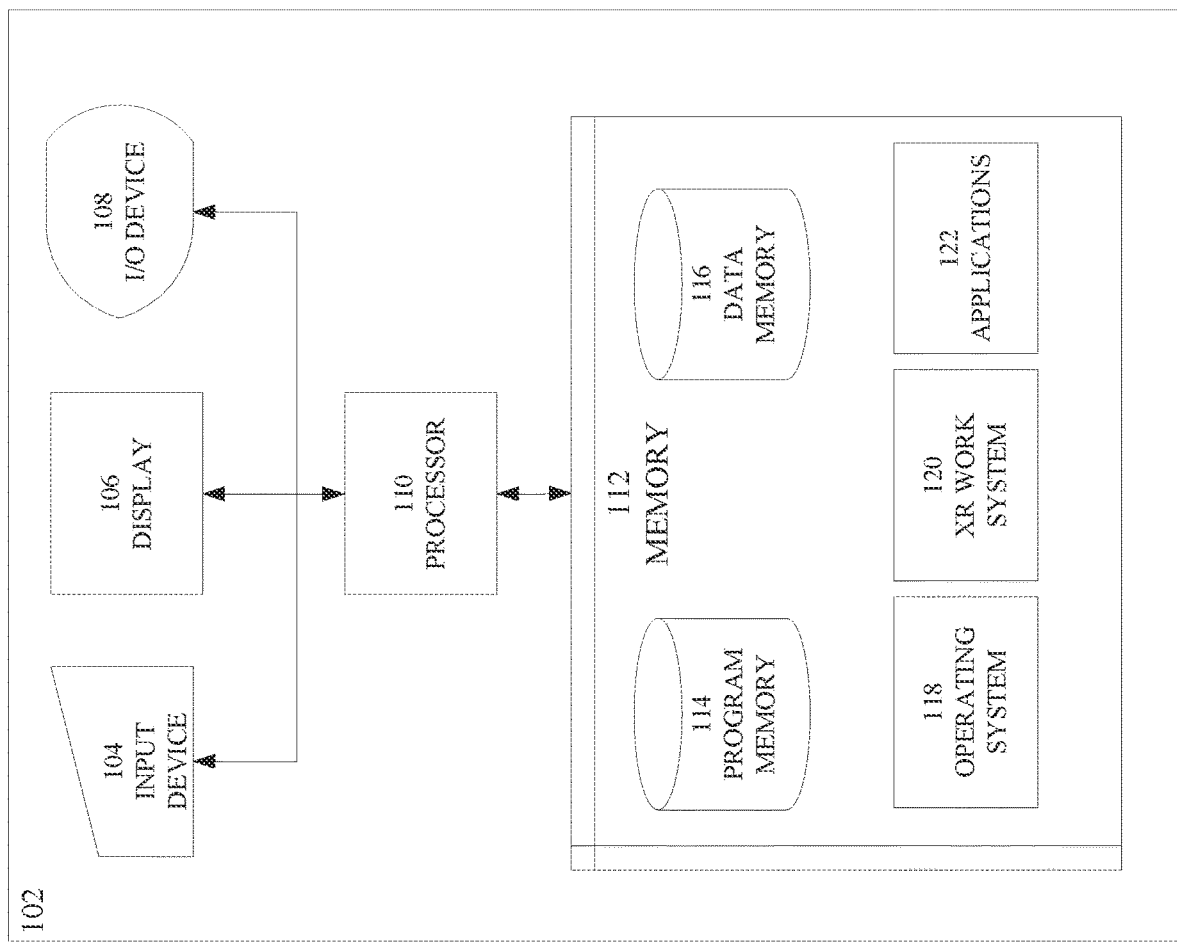
FIG. 1 is a block diagram of a device operating environment with which aspects of the subject technology can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The disclosed system addresses a problem in artificial reality tied to computer technology, namely, the technical problem of responsiveness to user inputs for navigation within a computer generated shared artificial reality environment. The disclosed system solves this technical problem by providing a solution also rooted in computer technology, namely, by providing natural navigation (e.g., scrolling) techniques to users of the artificial reality environment such as based on a sensed wrist movement input gesture. The disclosed system also improves the functioning of the computer used to generate the artificial reality environment because it enables the computer to improve communication between an artificial reality compatible user device and the computer. The present invention is integrated into a practical application of computer based graphical user interface enabled navigation and scrolling for virtual areas, objects, and/or elements. In particular, the disclosed system provides more responsive, natural, and effective scrolling based on an improved quantity and/or quality of control methods/mechanisms that more quickly and accurately translate input wrist gestures into user desired navigation commands in the artificial reality environment, such as scrolling through virtual list elements in the environment.

Aspects of the present disclosure are directed to creating and administering artificial reality environments. For example, an artificial reality environment may be a shared artificial reality environment, a virtual reality (VR), an augmented reality environment, a mixed reality environment, a hybrid reality environment, a non immersive environment, a semi immersive environment, a fully immersive environment, and/or the like. The artificial environments may also include artificial collaborative gaming, working, and/or other environments which include modes for interaction between various people or users in the artificial environments. The artificial environments of the present disclosure may provide elements that enable users to navigate (e.g., scroll) in the environments via function expansions in the user's wrist, such as via pinching, rotating, tilting, and/or the like. For example, the degree that the user's wrist is tilted can correspond to how quickly a scrollable list is scrolled through in the artificial environments (e.g., more tilt results in faster scrolling while less tile results in slower scrolling). As used herein, "real-world" objects are non-computer generated and artificial or VR objects are computer generated. For example, a real-world space is a physical space occupying a location outside a computer and a real-world object is a physical object having physical properties outside a computer. For example, an artificial or VR object may be rendered and part of a computer generated artificial environment.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some implementations, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. AR also refers to systems where light entering a users' eye is partially generated by a computing system and partially composes light reflected off objects in the real world. For example, an AR headset could be shaped as a pair of glasses with a pass-through display, which allows light from the real-world to pass through a waveguide that simultaneously emits light from a projector in the AR headset, allowing the AR headset to present virtual objects intermixed with the real objects the user can see. The AR headset may be a block-light headset with video pass-through. "Artificial reality," "extra reality," or "XR," as used herein, refers to any of VR, AR, MR, or any combination or hybrid thereof.

Several implementations are discussed below in more detail in reference to the figures. FIG. 1 is a block diagram of a device operating environment 100 with which aspects of the subject technology can be implemented. The device operating environment can comprise hardware components of a computing system 100 that can create, administer, and provide interaction modes for a shared artificial reality environment (e.g., collaborative artificial reality environment) such as for navigation and/or scrolling via XR elements. The interaction modes can include various modes for various input gestures, control modes, scrolling parameters, etc. for each user of the computing system 100. In various implementations, the computing system 100 can include a single computing device or multiple computing devices 102 that communicate over wired or wireless channels to distribute processing and share input data.

In some implementations, the computing system 100 can include a stand-alone headset capable of providing a computer created or augmented experience for a user without the need for external processing or sensors. In other implementations, the computing system 100 can include multiple computing devices 102 such as a headset and a core processing component (such as a console, mobile device, or server system) where some processing operations are performed on the headset and others are offloaded to the core processing component. Example headsets are described below in relation to FIGS. 2A-2B. In some implementations, position and environment data can be gathered only by sensors incorporated in the headset device, while in other implementations one or more of the non-headset computing devices 102 can include sensor components that can track environment or position data, such as for implementing computer vision functionality. Additionally or alternatively, such sensors can be incorporated as wrist sensors, which can function as a wrist wearable for detecting or determining user input gestures. For example, the sensors may include inertial measurement units (IMUs), eye tracking sensors, electromyography (e.g., for translating neuromuscular signals to specific gestures), time of flight sensors, light/optical sensors, and/or the like to determine the inputs gestures, how user hands/wrists are moving, and/or environment and position data.

The computing system 100 can include one or more processor(s) 110 (e.g., central processing units (CPUs), graphical processing units (GPUs), holographic processing units (HPUs), etc.) The processors 110 can be a single processing unit or multiple processing units in a device or distributed across multiple devices (e.g., distributed across two or more of computing device 102s). The computing system 100 can include one or more input devices 104 that provide input to the processors 110, notifying them of actions. The actions can be mediated by a hardware controller that interprets the signals received from the input device 104 and communicates the information to the processors 110 using a communication protocol. As an example, the hardware controller can translate signals from the input devices 104 to simulate click moment or flip momentum with respect to XR scrolling, such as based on a transfer function. Each input device 104 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, and/or other user input devices.

The processors 110 can be coupled to other hardware devices, for example, with the use of an internal or external bus, such as a PCI bus, SCSI bus, wireless connection, and/or the like. The processors 110 can communicate with a hardware controller for devices, such as for a display 106. The display 106 can be used to display text and graphics. In some implementations, the display 106 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and/or the like. Other I/O devices 108 can also be coupled to the processor, such as a network chip or card, video chip or card, audio chip or card, USB, firewire or other external device, camera, printer, speakers, CD-ROM drive, DVD drive, disk drive, etc.

The computing system 100 can include a communication device capable of communicating wirelessly or wire-based with other local computing devices 102 or a network node. The communication device can communicate with another device or a server through a network using, for example, TCP/IP protocols. The computing system 100 can utilize the communication device to distribute operations across multiple network devices. For example, the communication device can function as a communication module. The communication device can be configured to transmit or receive input gestures for determining navigation commands in XR environments or for XR objects (e.g., comprising scrollable lists).

The processors 110 can have access to a memory 112, which can be contained on one of the computing devices 102 of computing system 100 or can be distributed across one of the multiple computing devices 102 of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 112 can include program memory 114 that stores programs and software, such as an operating system 118, XR work system 120, and other application programs 122 (e.g., XR games). The memory 112 can also include data memory 116 that can include information to be provided to the program memory 114 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, and/or the like.

Figure 2B:
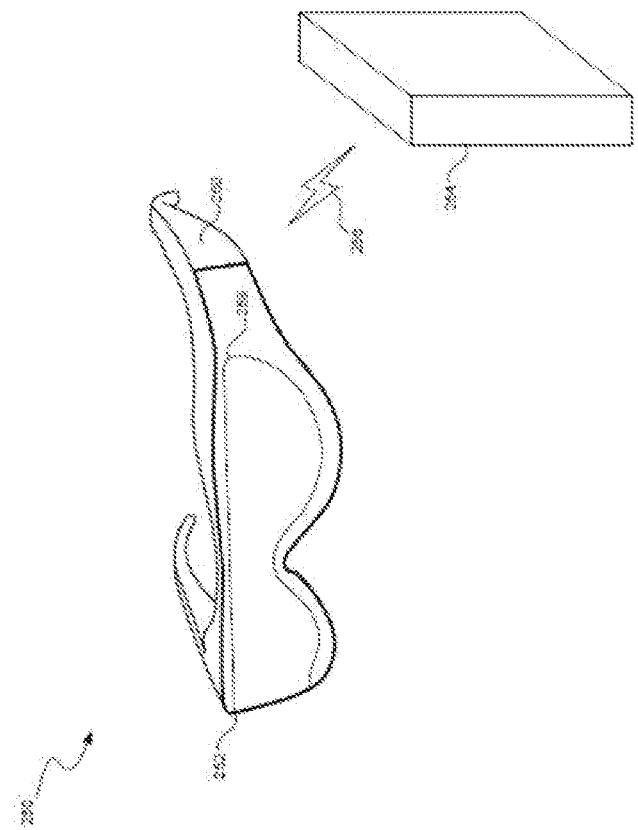
FIGS. 2A-2B are diagrams illustrating virtual reality headsets, according to certain aspects of the present disclosure.
Figure 2A:
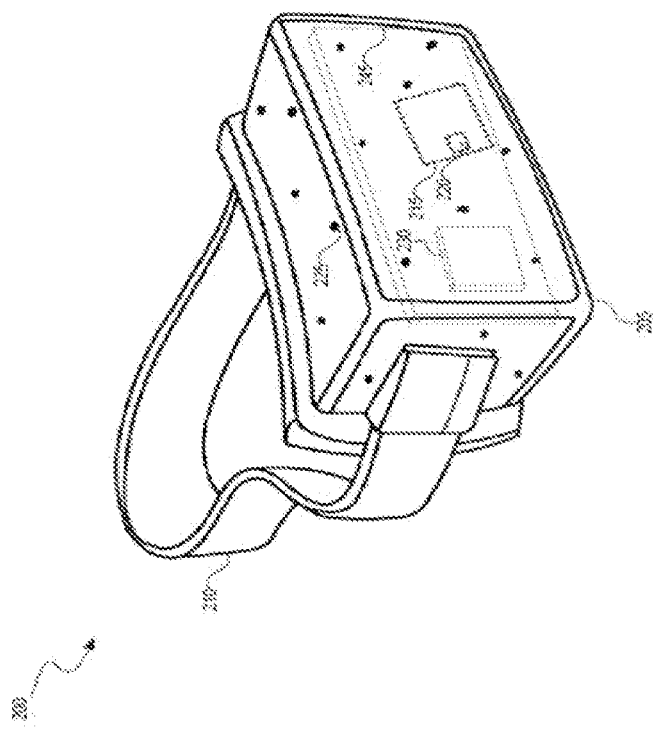

FIGS. 2A-2B are diagrams illustrating virtual reality headsets, according to certain aspects of the present disclosure. FIG. 2A is a diagram of a virtual reality head-mounted display (HMD) 200. The HMD 200 includes a front rigid body 205 and a band 210. The front rigid body 205 includes one or more electronic display elements such as an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF), six degrees of freedom (6DoF), etc. For example, the locators 225 can emit infrared light beams which create light points on real objects around the HMD 200. As another example, the IMU 215 can include, e.g., one or more accelerometers, gyroscopes, magnetometers, other non-camera-based position, force, or orientation sensors, or combinations thereof. One or more cameras (not shown) integrated with the HMD 200 can detect the light points, such as for a computer vision algorithm or module. The compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

FIG. 2B is a diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by the link 256. In other implementations, the mixed reality system 250 includes a headset only, without an external compute device or includes other wired or wireless connections between the mixed reality HMD 252 and the core processing component 254. The mixed reality system 250 may also include a wrist wearable, such as for converting wrist input gestures into navigation commands for scrolling in XR environments. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc. The electronic components may be configured to implement computing vision-based hand tracking for translating hand movements and positions to XR navigation commands.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the users' eye. The output light can mix with light that passes through the display 258, allowing the output light to present virtual objects that appear as if they exist in the real-world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects For example, the HMD system 250 can track the motion and position of user's wrist movements as input gestures for performing navigation such as scrolling of XR objects in a manner that is mapped to the input gestures. As an example, the HMD system 250 may include a coordinate system to track the relative hand positions for each user for determining how the user desires to scroll through the artificial reality environment with XR scrolling. In this way, the HMD system 250 can enable users to have a natural response and intuitive sense of controlled navigation and scrolling with their hands. The hand-based scrolling can be based on a single control method or a hybrid of multiple control methods, such as a combination of flick and drag position control, for example.

Figure 2C:
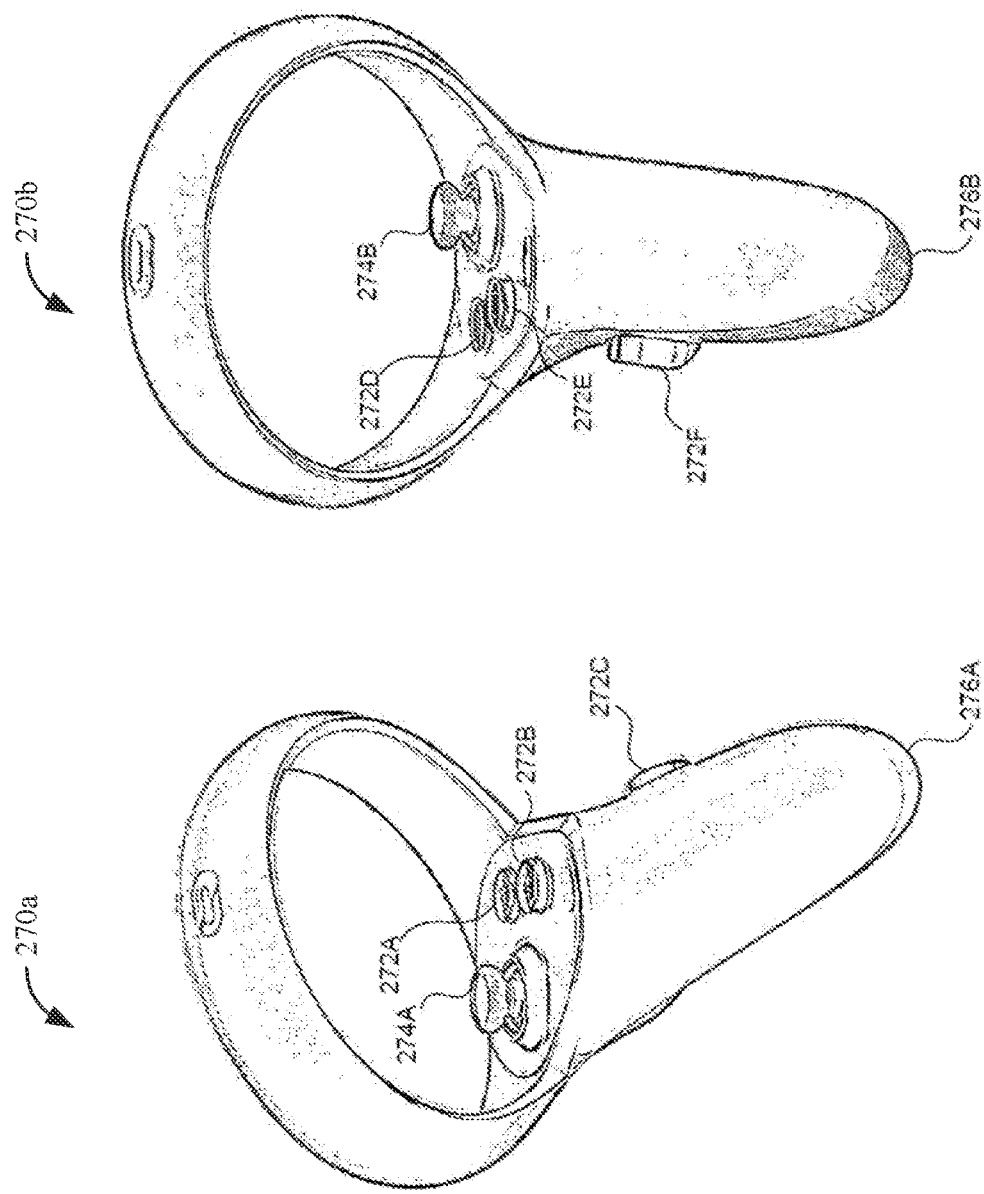
FIG. 2C illustrates controllers for interaction with an artificial reality environment, according to certain aspects of the present disclosure.

FIG. 2C illustrates controllers 270a-270b, which, in some implementations, a user can hold in one or both hands to interact with an artificial reality environment presented by the HMD 200 and/or HMD 250. The controllers 270a-270b can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. For example, the compute units 230 can use the monitored hand positions to implement position control, rate control, nudges, and/or a combination thereof through a scrollable list. As an example, the compute units 230 can calculate a parameter for traversal through items of the scrollable list.

Position control may refer to the angle of a user's hand being used to set a position of the scrollable list. The compute units 230 may calculate start and release of list traversal, speed of scrolling through the list, and momentum of list movement. For example, momentum of list movement can refer to calculation of a transfer function by the compute units 230 to simulate movement through the scrollable list with a simulated inertia of a user controlled "flick" through the list. The compute units 230 may, via the IMU outputs (or other sensor outputs via the controllers 270a-270b), compute the change in position of the user's hand for defining an input gesture. For example, the compute units 230 may implement computer vision/sensor-based hand tracking for determining that the user has made a pinch motion and moved down with their hand(s). Such a wrist motion can be defined as an input gesture that is translated into a navigation command for selecting a scrollable XR object and scrolling downwards through a list of the XR object. As discussed herein, the compute units 230 can support hybrid control methods that enables two or more different actions such as dragging and flicking for scrolling.

The compute units 230 can also be configured to implement a natural or an unnatural scrolling mode, which can be defined as simulated touch screen scrolling or not. The compute units 230 may also apply a transfer function in conjunction with sensed momentum from the controllers 270a-270b. For example, the controllers 270a-270b can determine a corresponding momentum of a flicking gesture that the user makes with their hand, which can simulate the action of flicking an XR list in a particular direction. The transfer function, such as a linear or quadratic transfer function, can define the momentum or inertia of how long the flicked list moves in the particular direction before stopping. The compute units 230 can also compute the change in position of the user's hand for tracking other types of hand/wrist input gestures, such as the user defining scrolling with a ring-based input gesture. That is, as the user moves their hand or finger in a circle, this may be converted into a navigation command to scroll through the XR list. The compute units 230 can implement any combination of flexion and extension, pronation and supination, radial and ulnar input gestures.

The controllers 270a-270b can also include various buttons (e.g., buttons 272A-F) and/or joysticks (e.g., joysticks 274A-B), which a user can actuate to provide input and interact with objects. As discussed below, controllers 270a-270b can also have tips 276A and 276B, which, when in scribe controller mode, can be used as the tip of a writing implement in the artificial reality environment. In various implementations, the HMD 200 or 250 can also include additional subsystems, such as a hand tracking unit, an eye tracking unit, an audio system, various network components, etc. to monitor indications of user interactions and intentions. For example, in some implementations, instead of or in addition to controllers, one or more cameras included in the HMD 200 or 250, or from external cameras, can monitor the positions and poses of the users' hands to determine gestures and other hand and body motions. Such camera-based hand tracking can be referred to as computer vision, for example. Sensing subsystems of the HMD 200 or 250 can be used to define motion (e.g., user hand/wrist motion) along an axis (e.g., three different axes) along which the flexion and extension, pronation and supination, radial and ulnar input gestures can be performed for determining corresponding navigation commands.

Figure 3:
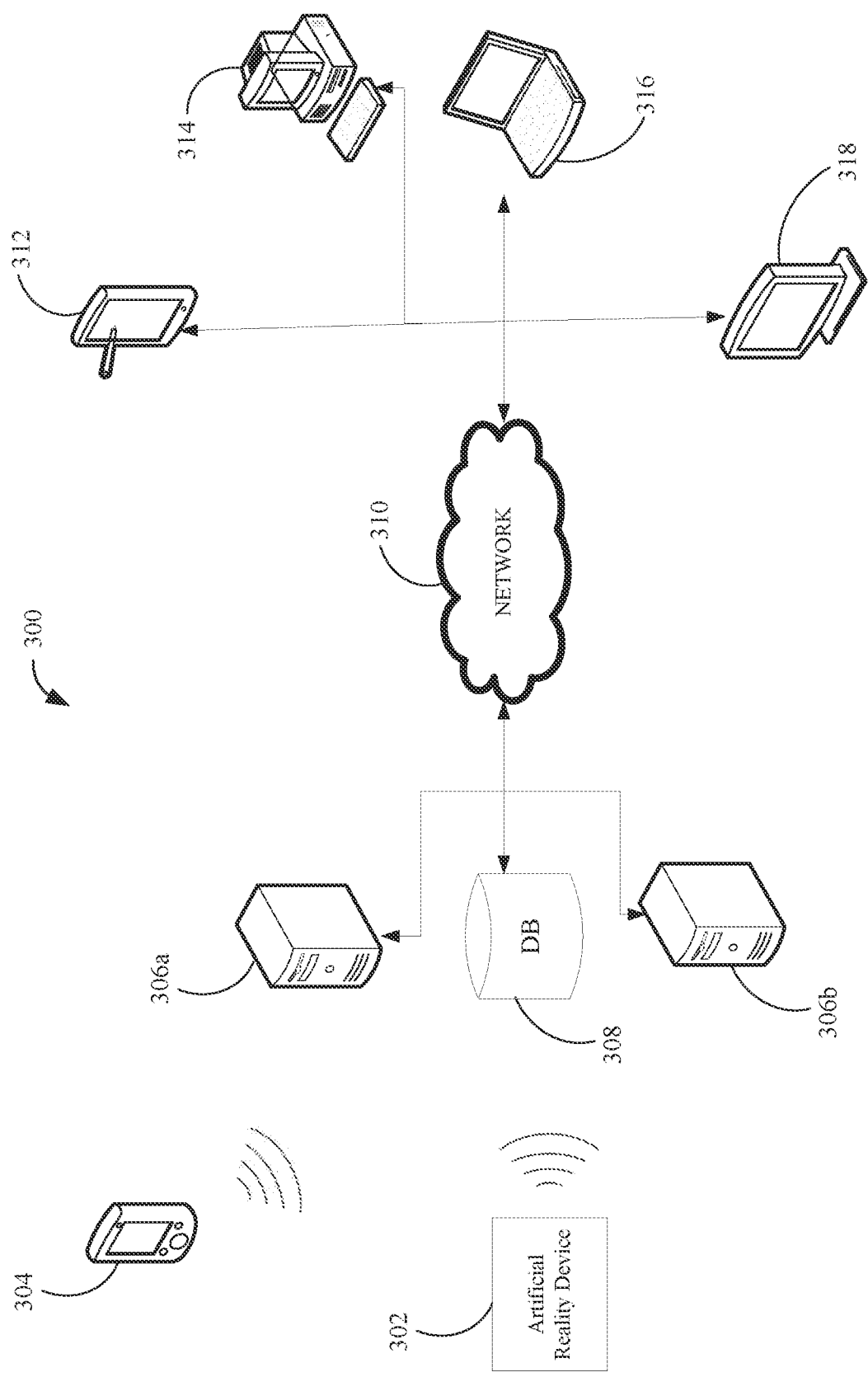
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices, such as artificial reality device 302, mobile device 304, tablet 312, personal computer 314, laptop 316, desktop 318, and/or the like. The artificial reality device 302 may be the HMD 200, HMD system 250, a wrist wearable, or some other XR device that is compatible with rendering or interacting with an artificial reality or virtual reality environment. The artificial reality device 302 and mobile device 304 may communicate wirelessly via the network 310. In some implementations, some of the client computing devices can be the HMD 200 or the HMD system 250. The client computing devices can operate in a networked environment using logical connections through network 310 to one or more remote computers, such as a server computing device.

In some implementations, the environment 300 may include a server such as an edge server which receives client requests and coordinates fulfillment of those requests through other servers. The server may include server computing devices 306a-306b, which may logically form a single server. Alternatively, the server computing devices 306a-306b may each be a distributed computing environment encompassing multiple computing devices located at the same or at geographically disparate physical locations. The client computing devices and server computing devices 306a-306b can each act as a server or client to other server/client device(s). The server computing devices 306a-306b can connect to a database 308 or can comprise its own memory. Each server computing devices 306a-306b can correspond to a group of servers, and each of these servers can share a database or can have their own database. The database 308 may logically form a single unit or may be part of a distributed computing environment encompassing multiple computing devices that are located within their corresponding server, located at the same, or located at geographically disparate physical locations.

The memory of the server computing devices 306a-306b or the database 308 can store scrolling or navigation information such as data indicative of various control methods. For a particular XR device such as a wrist sensor, a user may perform an input gesture such as a particular wrist gesture that can be converted to a navigation (e.g., scrolling) command according to a control method and/or scrolling parameter. The control method can be used to map a numerical angle (e.g., of the user's hand relative to a scrollable list) to wrist movement determined by the wrist sensor. In particular, a position control method may refer to a control method in which the angle of the hand drives a position of the scrollable list. Rate control may refer to a joystick type control method in which the angle of the hand drives the velocity of scrolling through the scrollable list. Another control method may be based on discrete nudges from individual elements of the scrollable list such as moving one instance or items of the scrolling list at a time per nudge, moving three items at a time, or moving some other discrete quantity based on a discrete nudge detected by the wrist sensor via movement of the hand.

Various hybrids of control methods can be implemented by sensed detection of the user hand position and/or movement by the particular XR device. For example, the particular XR device may determine that the discrete nudge control method should be triggered based on the relative angle and/or movement of the hand and also determine that the rate control method should be triggered if the hand makes a pinch and hold motion. Either of the natural or hybrid control methods may also be combined with the scrolling parameter such as Boolean choices between natural or unnatural scrolling, stateless or stateful pinch, and/or the like. Natural scrolling can refer to touchscreen type scrolling that tracks natural hand/finger motion while stateful pinch can refer to holding XR objects (e.g., the scrollable list) via the user hand control with a pinch and releasing the scrollable list with another pinch. That is, stateful pinch may enable XR users to experience the sensation and control of holding and release XR elements via a single pinching motion with their hands. The stateful or stateless parameter/characteristic of the input gesture can change how the input gesture is implemented and used to interpret corresponding navigation commands applied to artificial reality environments.

The network 310 can be a local area network (LAN), a wide area network (WAN), a mesh network, a hybrid network, or other wired or wireless networks. The network 310 may be the Internet or some other public or private network. Client computing devices can be connected to network 310 through a network interface, such as by wired or wireless communication. The connections can be any kind of local, wide area, wired, or wireless network, including the network 310 or a separate public or private network. In some implementations, the server computing devices 306a-306b can be used as part of a social network such as implemented via the network 310. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc.

Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea. A social networking system can enable a user to enter and display information related to the users' interests, age/date of birth, location (e.g., longitude/latitude, country, region, city, etc.), education information, life stage, relationship status, name, a model of devices typically used, languages identified as ones the user is familiar with, occupation, contact information, or other demographic or biographical information in the users' profile. Any such information can be represented, in various implementations, by a node or edge between nodes in the social graph.

A social networking system can enable a user to upload or create pictures, videos, documents, songs, or other content items, and can enable a user to create and schedule events. Content items can be represented, in various implementations, by a node or edge between nodes in the social graph. A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their avatar or true-to-life representation) with objects or other avatars in a virtual environment (e.g., in an artificial reality working environment), etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment where users can communicate and interact via avatars or other digital representations of themselves. Further, a first user can comment on the profile page of a second user or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identifies a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

Figure 4:
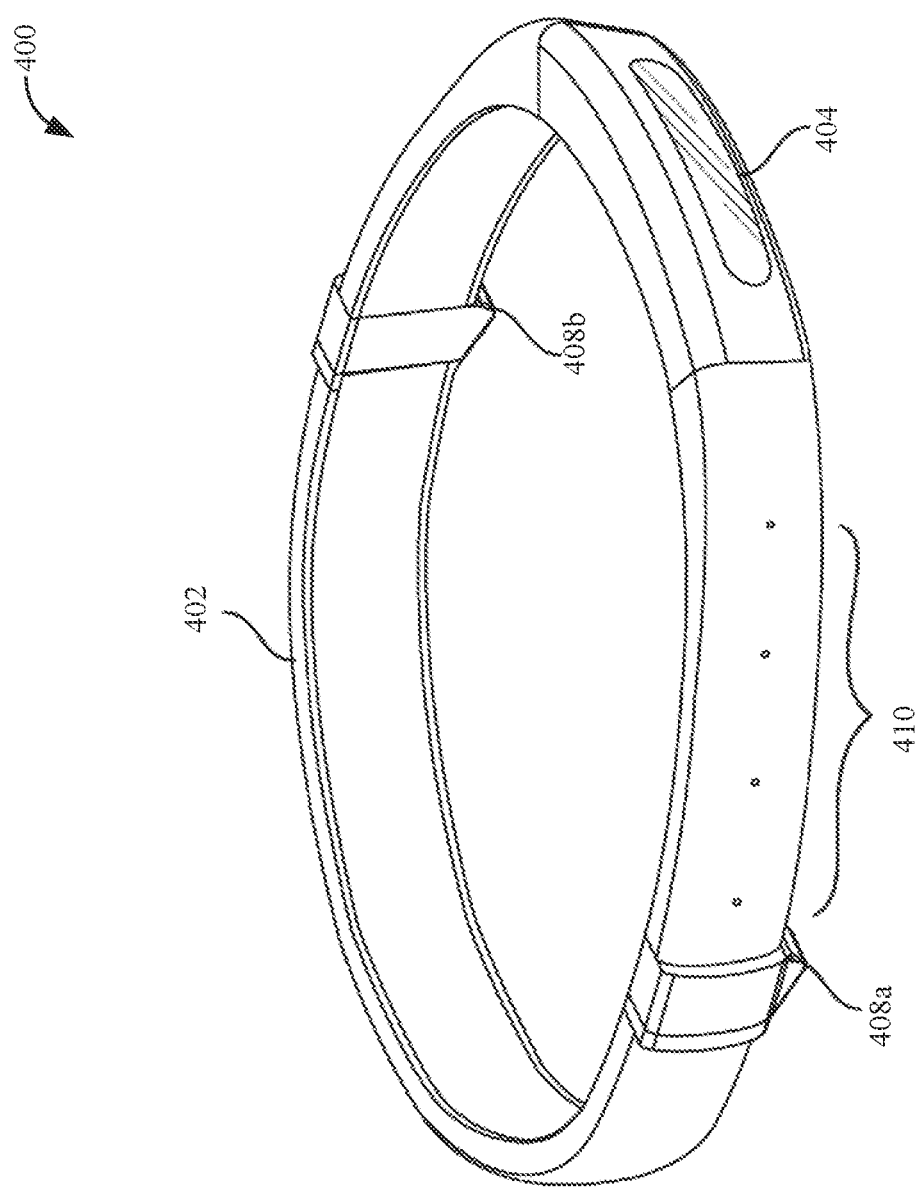
FIG. 4 illustrates an example artificial reality wearable, according to certain aspects of the present disclosure.

FIG. 4 illustrates an example artificial reality wearable, according to certain aspects of the present disclosure. For example, the artificial reality wearables can be a wrist wearable such as a XR wrist sensor 400. The wrist sensor 400 may be configured to sense position and movement of a user's hand in order to translate such sensed position and movement into input gestures. For example, the input gestures may be micro movements of the user's wrist. As an example, the wrist movements may include rotation, pinching, holding downward, holding upward, sliding, flicking, other suitable wrist movements, etc. The XR wrist sensor 400 may generally represent a wearable device dimensioned to fit about a body part (e.g., a wrist) of the user. As shown in FIG. 4, the XR wrist sensor 400 may include a frame 402 and a sensor assembly 404 that is coupled to frame 402 and configured to gather information about a local environment by observing the local environment. The sensor assembly 404 can include cameras, IMU eye tracking sensors, electromyography (EMG) sensors, time of flight sensors, light/optical sensors, and/or the like to track wrist movement.

In this way, the XR wrist sensor 400 can determine/detect the user input gestures, interpret position and movement data of the user's wrist, and convert wrist input gestures to navigation commands based on specified control method(s), scrolling parameter(s) and/or the like. The XR wrist sensor 400 may also include one or more audio devices, such as output audio transducers 408a-408b and input audio transducers 410. The output audio transducers 408a-408b may provide audio feedback and/or content to the user while the input audio transducers 410 may capture audio in the user's environment. The XR wrist sensor 400 may also include other types of screens or visual feedback devices (e.g., a display screen integrated into a side of frame 102). In some embodiments, the wrist wearable 400 can instead take another form, such as head bands, hats, hair bands, belts, watches, ankle bands, rings, neckbands, necklaces, chest bands, eyewear frames, and/or any other suitable type or form of apparatus. Other forms of the XR wrist sensor 400 may be different wrist bands with a different ornamental appearance than the XR wrist sensor 400 but perform a similar function for sensing wrist input gestures for XR navigation and scrolling in artificial reality environments.

Figure 5:
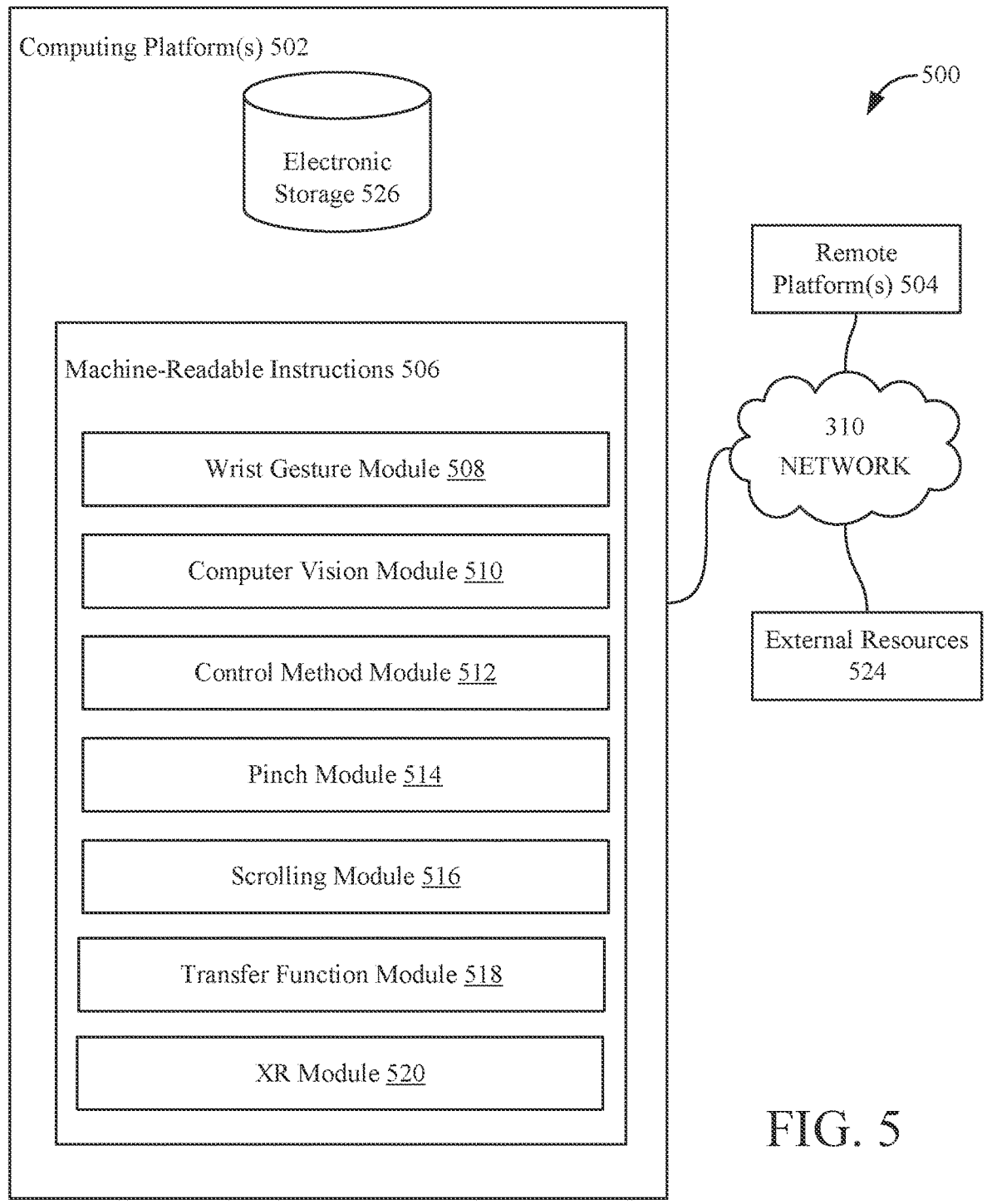
FIG. 5 is a block diagram illustrating an example computer system (e.g., representing both client and server) with which aspects of the subject technology can be implemented.

FIG. 5 is a block diagram illustrating an example computer system 500 (e.g., representing both client and server) with which aspects of the subject technology can be implemented. The system 500 may be configured for navigating through a shared artificial reality environment, according to certain aspects of the disclosure. In some implementations, the system 500 may include one or more computing platforms 502. The computing platform(s) 502 can correspond to a server component of an artificial reality/XR platform, which can be similar to or the same as the server computing devices 306a-306b of FIG. 3 and include the processor 110 of FIG. 1. The computing platform(s) 502 can be configured to store, receive, determine, and/or analyze user preferences (e.g., navigation preferences) and/or user information to improve scrolling and an overall user experience of the shared artificial reality environment. For example, the computing platform(s) 502 may be configured to execute algorithm(s) (e.g., mapping algorithms, transfer function algorithms, machine learning algorithms etc.) to convert sensed wrist movements (e.g., flexion and extension, pronation and supination, radial and ulnar, etc.) such as via a computer vision-based user hand tracking (e.g., HMD 200, HMD system 250) or via wrist movement tracking from a wrist wearable 400a-400b to implement navigation commands in the shared artificial reality environment.

As an example, the wrist movements can be user micro gestures that are detectable for implementing the navigation commands for scrolling relative to XR elements such as an XR virtual area, XR object, virtual scrollable list, and/or the like. Such wrist movements and gestures can be detected by a wrist gesture module 508. The computing platform(s) 502 can maintain or store data, such as in the electronic storage 526, for representing navigation (e.g., scrolling) techniques for enabling selections of various natural intuitive scrolling techniques for XR users. Such scrolling techniques can include user hand gestures relative to a fixed neutral point at a reference angle, such as pinching (e.g., thumb-to-forefinger or other wrist pinch gesture above the fixed neural point to nudge a scrollable list up once and thumb-to-forefinger pinch gesture below the point to nudge the scrollable list down once) to simulate an arrow key function or to simulate grabbing the scrollable list in place, increasing/decreasing scrolling speed via wrist gesture at increased/decreased angle (relative to reference angle) in a continuous scrolling mode, simulate dragging the list by angling the user hand and release the hand gesture with a particular velocity to flick the list, and/or the like. The scrolling techniques to simulate scrolling functions via wrist gestures described herein may be implemented by mapping user hand angle (relative to reference angle/fixed point) to navigation commands rather than using raycasts (e.g., raycast from the user's hand to determine the position of a reticle on an XR user interface to form a type of XR touch-screen finger).

The computing platform(s) 502 may be configured to communicate with one or more remote platforms 504 according to a client/server architecture, a peer-to-peer architecture, and/or other architectures. The remote platform(s) 504 may be configured to communicate with other remote platforms via computing platform(s) 502 and/or according to a client/server architecture, a peer-to-peer architecture, and/or other architectures. Users may access the system 500 hosting the shared artificial reality environment and/or personal artificial reality via remote platform(s)

504. In this way, the remote platform(s) 504 can be configured to cause output of a personalized version of the shared artificial reality environment on client device(s) of the remote platform(s) 504, such as via the HMD 200, HMD system 250, and/or controllers 270a-270b of FIG. 2C. As an example, the remote platform(s) 504 can access artificial reality content and/or artificial reality applications for use in the shared artificial reality for the corresponding user(s) of the remote platform(s) 504, such as via the external resources 524. The computing platform(s) 502, external resources 524, and remote platform(s) 504 may be in communication and/or mutually accessible via the network 310.

The computing platform(s) 502 may be configured by machine-readable instructions 506. The machine-readable instructions 506 may be executed by the computing platform(s) to implement one or more instruction modules. The instruction modules may include computer program modules. The instruction modules being implemented may include one or more of wrist gesture module 508, computer vision module 510, control method module 512, pinch module 514, scrolling module 516, transfer function module 518, XR module 520, and/or other instruction modules.

As discussed herein, the wrist gesture module 508 can convert input gestures to navigation (e.g., scrolling commands) in an XR environment, such as based on wrist movement detection by a sensor component (e.g., sensor assembly 404) of the remote platform(s) 504, such as for each XR compatible device of the remote platforms(s) 504. The XR compatible device can be or include HMDs 200, 250, wrist wearables 400a-400b, or some other type of XR applicable device. Based on sensed data from the remote platform(s) 504, the wrist gesture module 508 can determine an angle, relative coordinate, rotation, and/or other position/movement parameter of an input gesture, such as according to a coordinate system implemented by the computing platform(s) 502 (e.g., via XR module 520). For example, the sensed data can be IMU data, eye tracking data, EMG data, time of flight data, optical data, and/or the like in order to characterize physical parameters of the input gesture such as the pose of the user's hand when and during the making of the input gesture. The wrist gesture module 508 can output a computerized rendering of the user's hand according to the actual sensed movement and position of the hand, which can be mapped to a navigation/scrolling command according to specified control method(s) from the control method module 512 and scrolling parameter(s) from the scrolling module 516. As an example, wrist gestures may include flexion and extension, pronation and supination, radial and ulnar, etc. Flexion can be visualized as the wrist being flexed at a downward 120° angle, for example. Pronation can be visualized as rotation of the wrist, such as lateral rotation of the wrist when the hand is clenched into a fist. Ulnar deviation can be visualized as a waving type motion of the wrist such as the wrist being moved to a rightward 45° angle with the fingers held together.

The computer vision module 510 may implement a similar function as the wrist wearable sensor performs, such as to track input gestures. For example, the computer vision module 510 can be part of a head mounted sensor (e.g., of HMD 200, 250) in order to optically track user hand position and movement, such as via an eye tracking component. The computer vision module 510 can determine a relative position of various parts of the user such as their hands, arms, legs, and/or the like. In this way, the computer vision module 510 can enable the XR module 520 to generate an XR representation such as a user representation or avatar of the user in the shared artificial reality environment. In addition, the computer vision module 510 may generate sensed data such as based on visual tracking on the user's position and movement in the real world so that changes in position and movement can be tracked and reflected in the shared artificial reality environment by the computer vision module 510. The computer vision module 510 can similarly track user position and movement, such as of the user's wrist, in order to implement navigation commands such as scrolling of scrollable elements of XR elements based on how the wrist moves. In other words, the wrist movement can be an input gesture that is translated into a navigation command based on control method(s) and scrolling parameter(s).

The control method module 512 may specify one or more control methods being used for translation of the navigation command. The control methods may include position control, rate control, discrete nudge, hybrid control methods, etc. A position control method may refer to a control method in which the angle of the hand drives a position of the scrollable list. Rate control may refer to a joystick type control method in which the angle of the hand drives the velocity of scrolling through the scrollable list. As an example, the control methods may be used for scrolling for tasks such as rapidly scrolling and selecting items in a familiar location, leisurely browsing continuous content, and/or the like. The posture of the user's hand/wrist when making input gestures according to specified control methods can be based on an arm in front posture, arm at side posture, or some other suitable posture. The control methods may be specified by the control method module 512 to implement various scrolling techniques by the scrolling module 516. For example, the scrolling techniques can include pinch displacement nudge, pinch velocity nudge, rate control, position control, stateful joystick type A, stateful joystick type B, drag and flick, ring scrolling, and/or the like.

The pinch nudge scrolling techniques can refer to using a displacement distance of a user thumb-to-forefinger pinch motion or a speed of the pinch motion to control nudge a scrollable XR element, such as nudging the scrollable list one item down or up. The stateful joystick types can refer to using particular defined relative angles of the wrist to control scrolling and/or grabbing/releasing of the scrollable list. Drag and flick can refer to dragging an XR element with position control and "flicking" the XR element such as similar to the motion of a roulette wheel being spun. Ring scrolling may refer to the wrist being used to navigate based on moving the hand in a circle to scroll up and down the scrollable list such as moving clockwise causes the list to scroll up while moving counterclockwise causes the list to scroll down. The control method module 512 can specify multiple control methods as a combination or hybrid of methods for the user to perform navigation and scrolling in XR areas of the artificial reality environment. For example, a hybrid control method may be position control until a speed/velocity of the user's wrist motion exceeds a certain threshold at which point an inertial flick is performed for implementation of a different control method. That is, the control method module 512 may be configured with a certain threshold for switching control methods such as for performing the flick instead of the previously used control method. For example, the configured thresholds can be speed thresholds or displacement thresholds (e.g., navigation techniques at different displacements). Additionally or alternatively, the control method module 512 can be configured with multiple different types of gestures for hybrid control methods, such as short and long pinch, soft and firm pinch, etc.

The pinch module 514 may identify user pinching motions for conversion or determination of navigation commands according to selected or configured control method(s) and/or scrolling parameter(s). The user pinching motions can be detected by wrist wearables such as the wrist sensors 400a-400b. For example, the wrist sensors 400a-400b may comprise two IMUs, such as one IMU on the back of the user's hand and one on the wrist. The IMUs can be configured to detect pinch such as via a closed signal when the user pinches. For example, the IMUs can detect user pinch movements down (e.g., in a downward direction) and user pinch movements up (e.g., in an upward direction). Other pinch movements are also possible to be detected in order for the user to control scrolling. As an example, the user may use the pinch as an input gesture, such as using a pinch held in a specific direction to drag an XR element. In particular, the user can holding a pinch down to continuously scroll down an XR scrollable object (e.g., scrollable list) or the user can make discrete pinch motions to discretely move (e.g., discrete nudge) down instances of the list such as one pinch down causing the list to move down by one item instance.

In this way, the user can use pinches as an input gesture for navigation commands according to configured control method(s). For example, the user can use hybrid control methods with pinching motions such as using pinching to perform both dragging and flicking. The control method can be switched between dragging and flicking according to a threshold, so pinches can be interpreted as both dragging and flicking commands. The user may also use a hybrid control method to scroll with both rate control and position control. That is, both the angle and movement of the user's hand can be used to set position and movement rate of the scrollable list. The pinch module 514 may also detect stateful or stateless pinches depending on whether such a statefulness characteristic has been set as a scrolling parameter by the scrolling module 516. For stateful pinches, the pinch module 514 can interpret the respective use of pinch start and pinch release as performing different functions. For example, the pinch module 514 can detect a pinch start gesture by the user to activate a scrolling technique and detect a separate pinch release gesture by the user to stop scrolling the scrollable list, which can involve an XR simulation of holding the scrollable list by the user in the artificial reality environment. For stateless pinches, only the pinch start gesture may be used. For example, the pinch module 514 may detect that the user makes the pinch start gesture to toggle whether or not scrolling of the scrollable list is activated or pinch to nudge the scrollable list. The direction of movement or rotation of the user pinches can be according to the specified wrist gestures such as flexing up and down for flexion, rotating about a circular motion (e.g., rotating a first) for pronation, waving along a circle for ulnar deviation, circular hand movements, or any other suitable wrist gestures.

The scrolling module 516 may identify other configurable scrolling parameters or characteristics of XR scrolling. For example, the scrolling parameters can include stateful/stateless pinch, natural/unnatural scrolling, a type of transfer function (e.g., via the transfer function module 518), selection mechanisms, and/or the like. The type of transfer function can be used for the scrolling module 516 to determine a momentum of scrolling, such as a simulated movement inertia based on specific input gestures such as the user flicking the scrollable list. Selection mechanisms can refer to ways for the user to switch between or select specific scrolling parameters. The scrolling module 516 may implement scrolling techniques that advantageously support natural and intuitive one dimensional and two dimensional XR scrolling and selection in the shared artificial reality environment. The scrolling techniques described herein advantageously may work well for: discrete and continuous tasks, short and long scrolling distances, quick and slow scrolling tasks, minimal user interfaces, with the user's arm at different positions (e.g., at the front or side), etc. The scrolling module 516 can also make adjustments for errors in pinch detection for the pinch module 514, such as based on uncertainty in pinch detection by IMUs (e.g., one IMU on the back of the hand and one of the wrist) or other sensors of the wrist wearables 400a-400b (e.g., wires connected to the band of the wrist wearables 400a-400b to close for generating signals that are indicative of pinch motions). Some scrolling techniques may be more sensitive to errors in pinch detection, such as an adjustment to address potential errors in detection such as inaccurate detection of the user closing or finishing a particular pinch motion. Stateful pinch detection can be more expressive based on the user being able to grab and release via pinch motions. In general, the scrolling module 516 may map the angle or velocity of the user wrist motion to scrolling movement.

The transfer function module 518 may control output of the shared artificial reality environment and personalized artificial reality environment. The transfer function module 518 can address noise artifacts in the wrist wearables 400a-400b. After accounting for noise, the transfer function module 518 can simulate a particular scrolling momentum, such as a click moment based on a wrist input gesture made by the user. For example, if the user makes a flick input gesture, the transfer function module 518 determines a moment of scrolling such as through the scrollable list based on a "momentum" corresponding to the flick input gesture. The extent of the momentum or momentum parameter can be determined by the transfer function module 518 based on a transfer function. The transfer function module 518 can select an optimal transfer function, such as a linear transfer function, quadratic transfer function, or other transfer that enables a more "controllable" momentum of scrolling through the scrollable list. As an example, the optimal transfer function may consider balance, precision, and speed for users to scroll to specific points of the long scrollable list. For example, the transfer function implemented by the transfer function module 518 may enable users to make relatively large flick gestures at the beginning of scrolling through the list and then start slowing down as the items in the scrollable list reach the desired point.

Prior to reaching the desired point, the transfer function module 518 can apply the selected transfer function to cause the momentum of scrolling that slows down and is more controllable by the user. The selected transfer function could be based on predictive knowledge by the transfer function module 518 of where the user is likely to stop in the predictive list, which could be based on past user history (e.g., previous user scrolling), characteristics of the scrollable list, scrolling context, machine learning algorithms, and/or the like. In general, the transfer function module 518 can improve the application of transfer functions to scrolling by enabling slower flicks to lead to slower momentum and faster flicks to lead to faster momentum. The transfer function module 518 advantageously may improve the user experience of scrolling by determining a more intuitive and natural scrolling experience corresponding to a better selected transfer function. In particular, the selected transfer function may balance how the transfer function module 518 translates or converts the particular speed of a flick made by the user to a particular level of momentum. The selected transfer function may correspond to the context of the scrollable list, such as what items are contained in the list, whether the list is being scrolled in as part of an XR game, how the items of the list are semantically different, etc. The transfer function applied by the transfer function module 518 can allow users to navigate or scroll in XR environments in a similar intuitive fashion to how they scroll on touch screen devices.

The XR module 520 may be used to render the shared artificial reality environment for remote platform(s) 504 via the computing platform(s) 502, for example. The XR module 520 may generate XR representations of navigation or scrolling actions, such as scrollbars, arrow keys, and/or the like. Such XR representations can be temporarily rendered as XR visual elements or not be rendered at all. The XR module 520 may also cause the user to receive scrolling feedback, such as visual, haptic, or other types of signal to indicate when a navigation or scrolling command is being performed. For example, the XR module 520 could cause the wrist wearable 400a-400b or other XR compatible device to vibrate when the user makes a pinch motion to start holding an XR element or another pinch motion to release the XR element. The XR module 520 may also provide XR visual elements that track or indicate the types or other characteristics of input gestures made by users.

As an example, the XR visual elements can include a ring XR element that reflects wrist "ring motion" as the user's wrist is rotated about a circular motion to scroll or navigate. As an example, the XR visual elements can include a hand XR element that reflects an open pinch, closed pinch, or in between pinch movement as the user makes pinch input gestures for selecting navigation commands. The XR module 520 may render XR objects for various navigation or scrolling tasks, such as discrete and continuous scrolling tasks, different scrolling distances (e.g., joystick type nudges, 2D or 3D navigation inputs, etc.), navigating through videos, etc. As an example, the XR module 520 and the scrolling module 516 may implement navigation and scrolling in XR applications (e.g., VR games) based on various input gestures. For example, the user can use various wrist input gestures at varying angles and movements (e.g., flicking motions, dragging motions, etc.) as well as pinching motions in order to select and perform game functions. For example, for a magic themed XR game, the user can pinch to select a portion or perform a specific wrist input gesture to perform a spell or teleportation. The user may also use specific input gestures with rate control and/or position control (or any other technique described herein) to control how, when, and how fast the user moves between different XR areas of the game or other XR applications (e.g., workspace-based applications).

In some implementations, the computing platform(s) 502, the remote platform(s) 504, and/or the external resources 524 may be operatively linked via one or more electronic communication links. For example, such electronic communication links may be established, at least in part, via the network 310 such as the Internet and/or other networks. It will be appreciated that this is not intended to be limiting, and that the scope of this disclosure includes implementations in which the computing platform(s) 502, the remote platform(s) 504, and/or the external resources 524 may be operatively linked via some other communication media.

A given remote platform 504 may include client computing devices, such as artificial reality device 302, mobile device 304 tablet 312, personal computer 314, laptop 316, and desktop 318, which may each include one or more processors configured to execute computer program modules. The computer program modules may be configured to enable an expert or user associated with the given remote platform 504 to interface with the system 500 and/or external resources 524, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms. The external resources 524 may include sources of information outside of the system 500, external entities participating with the system 500, and/or other resources. For example, the external resources 524 may include externally designed XR elements and/or XR applications designed by third parties. In some implementations, some or all of the functionality attributed herein to the external resources 524 may be provided by resources included in system 500.

The computing platform(s) 502 may include the electronic storage 526, a processor such as the processors 110, and/or other components. The computing platform(s) 502 may include communication lines, or ports to enable the exchange of information with a network and/or other computing platforms. Illustration of the computing platform(s) 502 in FIG. 5 is not intended to be limiting. The computing platform(s) 502 may include a plurality of hardware, software, and/or firmware components operating together to provide the functionality attributed herein to the computing platform(s) 502. For example, the computing platform(s) 502 may be implemented by a cloud of computing platforms operating together as the computing platform(s) 502.

The electronic storage 526 may comprise non-transitory storage media that electronically stores information. The electronic storage media of the electronic storage 526 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). The electronic storage 526 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 526 may include one or more virtual storage resources (e.g., cloud storage, a virtual private network, and/or other virtual storage resources). The electronic storage 526 may store software algorithms, information determined by the processor(s) 110, information received from computing platform(s) 502, information received from the remote platform(s) 504, and/or other information that enables the computing platform(s) 502 to function as described herein.

The processor(s) 110 may be configured to provide information processing capabilities in the computing platform(s) 502. As such, the processor(s) 110 may include one or more of a digital processor, an analog processor, a digital circuit designed to process information, an analog circuit designed to process information, a state machine, and/or other mechanisms for electronically processing information. Although the processor(s) 110 is shown in FIG. 1 as a single entity, this is for illustrative purposes only. In some implementations, the processor(s) 110 may include a plurality of processing units. These processing units may be physically located within the same device, or the processor(s) 110 may represent processing functionality of a plurality of devices operating in coordination. Processor(s) 110 may be configured to execute modules 508, 510, 512, 514, 516, 518, 520, and/or other modules. Processor(s) 110 may be configured to execute modules 508, 510, 512, 514, 516, 518, 520, and/or other modules by software; hardware; firmware; some combination of software, hardware, and/or firmware; and/or other mechanisms for configuring processing capabilities on the processor(s) 110. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 508, 510, 512, 514, 516, 518, and/or 520 are illustrated in FIG. 5 as being implemented within a single processing unit, in implementations in which the processor(s) 110 includes multiple processing units, one or more of the modules 508, 510, 512, 514, 516, 518, and/or 520 may be implemented remotely from the other modules. The description of the functionality provided by the different modules 508, 510, 512, 514, 516, 518, and/or 520 described herein is for illustrative purposes, and is not intended to be limiting, as any of the modules 508, 510, 512, 514, 516, 518, and/or 520 may provide more or less functionality than is described. For example, one or more of the modules 508, 510, 512, 514, 516, 518, and/or 520 may be eliminated, and some or all of its functionality may be provided by other ones of the modules 508, 510, 512, 514, 516, 518, and/or 520. As another example, the processor(s) 110 may be configured to execute one or more additional modules that may perform some or all of the functionality attributed below to one of the modules 508, 510, 512, 514, 516, 518, and/or 520.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
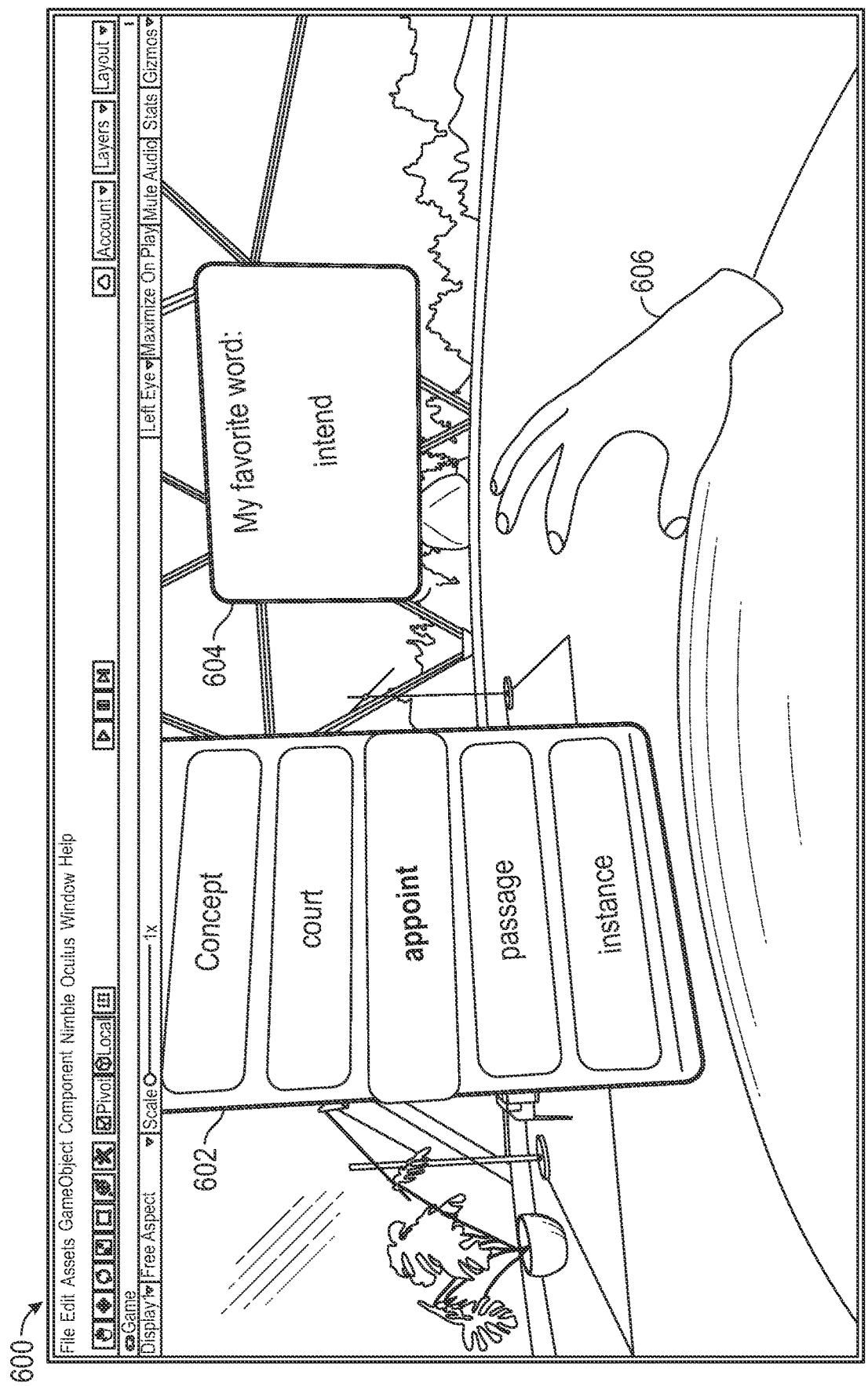
FIGS. 6-8 illustrate example views of user navigation in an artificial reality environment, according to certain aspects of the present disclosure.
Figure 7:
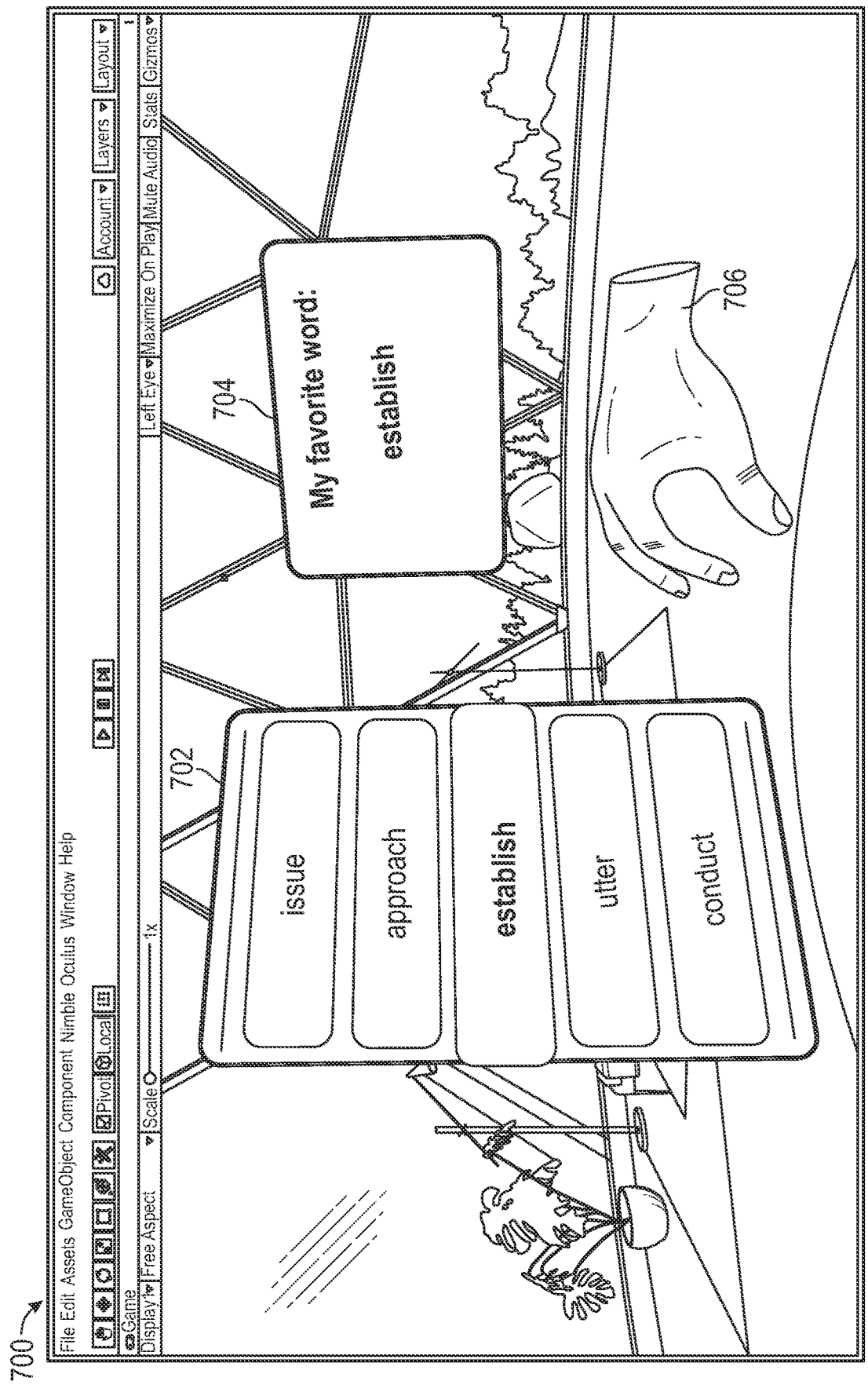
Figure 8:
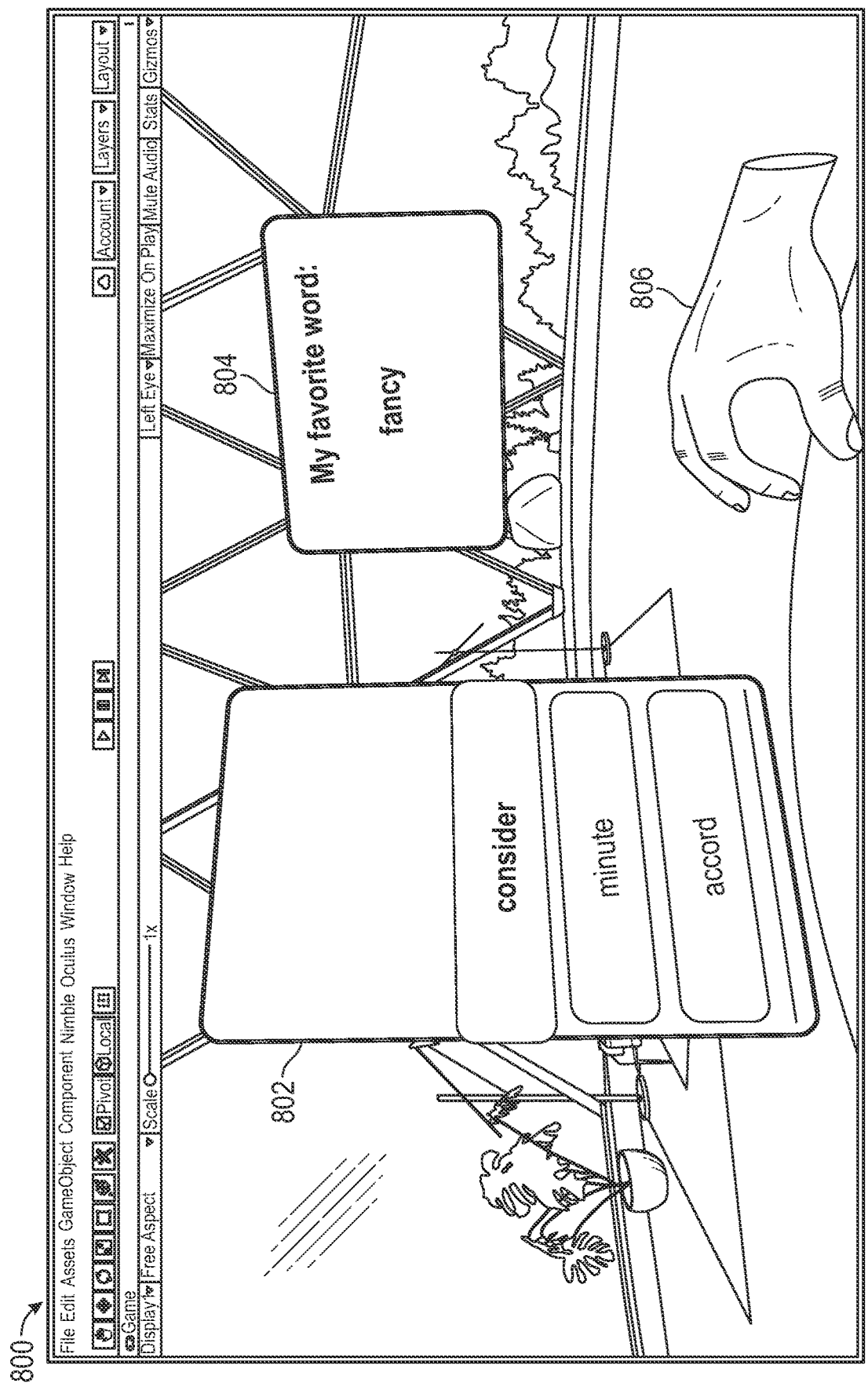

FIGS. 6-8 illustrate example views 600, 700, 800 of user navigation in an artificial reality environment, according to certain aspects of the present disclosure. The example view 600 may illustrate using an input gesture for rate control as a control method based on a relative angle of a user's wrist in the input gesture. The example view 700 may illustrate using an input gesture for a hybrid control method including nudge and rate control based on an absolute angle of the user's wrist in the input gesture. The example view 700 may illustrate using an input gesture for a position control (drag) with flick as a hybrid control method based on the position of the user's wrist in the input gesture. The example views 600, 700, 800 show XR scrollable lists 602, 702, 802 at various configurations; that is, the scrollable lists 602, 702, 802 may be scrolled at different levels of a scrolling range. Accordingly, the scrollable lists 602, 702, 802 each show different instances or XR items that are part of the scrollable lists 602, 702, 802. To navigate the scrollable lists 602, 702, 802, the user may use an input gesture to scroll up or scroll down through the scrollable lists 602, 702, 802.

Although FIGS. 6-8 illustrate scrolling up and down, it should be noted that other directions and types of scrolling or navigation are possible, such as scrolling to the left or right, scrolling in a circle, etc. The input gesture selected and/or performed by the user can be reflected or shown via the hand XR object 606, 706, 806. Additionally or alternatively, a hand can be rendered in non-XR formats. That is, hand gestures can be detected without user interface intervention. The hand gestures performed by the user can include any kind of system detectable specific gesture or microgesture. A particular instance or XR item can be selected via the hand XR object 606, 706, 806 and can be indicated by highlighting the selected instance(s) of the scrollable lists 602, 702, 802 such as the word "establish" in FIG. 7. In some embodiments, the highlighted word may be selected as a favorite word, which can be reflected in the XR text window 604, 704, 804. Alternatively, the highlight can be used merely to indicate what would be selected if the user performed a separate selection gesture. For example, in FIG. 6, the word "appoint" is highlighted in the scrollable list 602, but the current favorite word is shown as "intend" in the XR text window 604. If the user would make an input gesture that corresponds to a selection command, the favorite word would change to "appoint." The user may use an input gesture that corresponds to navigation/scrolling commands to scroll about the scrollable lists 602, 702, 802. The input gesture made by the user may be converted to navigation/scrolling commands based on the associated configured control method(s) and scrolling parameter(s). Such a conversion can be illustrated by the flexion/extension type input gestures explained by Appendix A.

For example, the example view 600 of FIG. 6 may depict relative rate control (e.g., a hybrid control method) being used. That is, the angle of a pinching motion made by the user as an input gesture may correspond to and/or be used to select a velocity of scrolling based on the relative difference between the angle (e.g., instantaneous angle) and a neutral point/threshold angle. The neutral point/threshold can be determined by the location of an earlier made pinch gesture. As an example, the velocity of scrolling may be calculated based on the difference between the hand's current location and the hand's location when the user stared making a pinching motion. The example view 700 of FIG. 7 may illustrate a displacement nudge with rate control. That is, each discrete pinching motion or held closed pinch by the user's wrist may be used as an input gesture to scroll through the list via a discrete nudge or for continuous scrolling, respectively. Each individual pinch can cause a discrete nudge of scrolling through the scrollable list 700 by one item, two items, or some other set discrete number of items/instances while the held pinching motion can cause the scrollable list 700 to be continuously scrolled through until the user releases the held pinching motion. For example, the example view 800 of FIG. 8 may illustrate a drag and flick control being used. That is, a dragging pinching motion can be used to scrolling through the list while a flicking pinch motion can be used to flick the scrollable list through (e.g., as if the list were a roulette wheel being spun) its constituent items with a moment controlled via an applicable transfer function, for example. The dragging and flicking control may be intuitive but require more movement for scrolling compared to the navigation/scrolling commands of FIG. 6 and FIG. 7.

In addition, the pinching motion can be stateful or stateless, such as depending on whether pinch start and release can be detected. Stateful pinching may refer to starting a pinch to hold the scrollable lists 602, 702, 802 and release the pinch to release the scrollable lists 602, 702, 802, while stateless pinching means using multiple pinches to hold or release the scrollable lists 602, 702, 802. Also, the pinching motion can be used as discrete pinches to act as arrow keys such as in FIG. 7. Furthermore, the user may either hold the pinch to scroll continuously or the user may pinch and displace further past or under a threshold distance to activate or deactivate continuous scrolling. Alternatively to the pinching motion, a similar arrow key-like technique could be implemented using thresholds and no pinches. As an example, the user can make a hand nudging motion up or down to cause a scrolling movement such as nudging the list whenever the hand crosses a displacement threshold. If the user holds their hand in this displaced position for a defined quantity of time, this may cause continuous scrolling such as with rate control.

Other types of user navigation are also possible and described herein. Specific steps of hand/wrist movements for user navigation are further illustrated and described in Appendix A. Types of user navigation and scrolling described herein can be a combination of interaction method (e.g., specific wrist gesture and control method combination/hybrid) and scrolling parameter considerations. As discussed herein, the interaction method can be a type of hand movement such as flexion/extension vs pronation/supination vs radial/ulnar deviation. The scrolling parameters can include settings such as snap on/off, natural/unnatural scrolling, transfer function type, and stateless/stateful pinch. Natural scrolling can refer to whether scrollable content moves in the same direction as the user's hand while unnatural scrolling refers to scrollable content moving in the opposite direction as the user's hand. Snap being on can refer to the central item in the list being automatically highlighted and the scrollable lists 602, 702, 802 will also snap the highlighted item into place when the scrollable lists 602, 702, 802 stops moving (snap being off turns off this highlight and snapping functionality). Stateful pinch can refer to controlling the scrollable lists 602, 702, 802 while pinching is currently occurring and releasing when pinching is not currently occurring. In contrast, stateless pinch can refer to the scrollable lists 602, 702, 802 switching from being controlled/held and released every time the user makes a pinching motion with their hand. The transfer function (e.g., linear or quadratic) can refer to simulation of scrolling momentum, such as by mapping hand angle to velocity. Many such settings can be adjusted to change the type of navigation applicable for the user. Some control methods introduce additional settings and parameters. For example, rate control could use a relative or a fixed center and a linear or a quadratic transfer function.

These settings can be used in any combination. For example, the user may make a flexion/extension type of input gesture according to rate control with a quadratic transfer function. This scrolling method may have a relative center setting turned off with natural scrolling and snap settings turned on. This can enable angle-based rate control. With this technique, the scrolling speed through the scrollable lists 602,702,802 is increased the more the user's hand is flexed/extended. Such rate control mimics the function of a gas pedal by making scrolling speed greater based on how flexed/extended the hand is. If unnatural scrolling is used and relative center is turned on with this scrolling method, then the rate control becomes relative rate control such that the scrolling speed through the scrollable lists 602, 702, 802 is greater the more that the hand is flexed/extended relative to where the user started a pinching motion (or displacement motion).

The quadratic transfer function may specify quadratic interpolation for mapping hand angle to velocity while linear transfer functions specify linear interpolation for the same motion. Another scrolling method involves using pronation/supination type of input gesture according to rate control with a linear transfer function. This scrolling method may have a relative center and snap settings turned off with unnatural scrolling turned on. This may enable relative angle-based rate control in which the velocity of scrolling is based on a relative angle of hand flexing/extension relative to a baseline angle. The direction of scrolling can be controlled based on the direction of user pronation/supination. As such, this scrolling method may be analogous to scrolling control via a gas knob. Another scrolling method may involve the user making a radial/ulnar type of input gesture according to rate control with a linear transfer function.

This scrolling method may have a relative center and snap settings turned off with natural scrolling turned on. This can result in a similar scrolling technique as the gas knob, but the scrolling velocity through the scrollable lists 602, 702, 802 is based on how much the hand is deviated, such as similar to a gas lever in which the greater the flexing, the faster the scrolling speed. Another scrolling method may involve the user making a flexion/extension type of input gesture according to position control with stateful pinch, natural scrolling, and without snap. That is, the user can hold and release the scrollable lists 602, 702, 802 without flicking being enabled. For example, the user pinches to "grab" the list and releases the pinch to "drop the list" while the scrollable lists 602, 702, 802 are displaced an amount proportion to how much the hand's angle is displaced from where it started as part of angle-based position control. Another scrolling method may involve the user making a pronation/supination type of input gesture according to position control with stateless pinch, natural scrolling, and with snap. For example, the user may pinch to "grab" the list and pinch again to "drop the list" while the scrollable lists 602, 702, 802 are displaced amount proportional to how much the hand's angle is displaced from where it started as part of angle-based position control. Such position control may require grabbing and releasing the list. For example, if the scrollable lists 602, 702, 802 are relatively long, the user may not be able to fully scroll through the list within their range of flexion/extension. In such a case, the user may be required to grab and release the list multiple times as part of repeating the scrolling gesture.

Another scrolling method may involve the user making a radial/ulnar type of input gesture according to position control with stateful pinch, unnatural scrolling, and with snap. Another scrolling method can involve the user making a flexion/extension type of input gesture according to inertia control with natural scrolling and with snap. As an example, this angle-based inertia control can simulate the scrollable lists 602, 702, 802 resting on a surface. Changing the hand's angle "tilts" the surface, causing the content of the scrollable lists 602, 702, 802 to slide in the corresponding direction. If the user's hand returns to neutral, the list will continue moving for a while until simulated "friction" slows it to a stop; the simulated friction can be predetermined such as based on a transfer function. To stop the movement of the scrollable lists 602, 702, 802 more quickly, the user can briefly angle their hand in the opposite direction. Another scrolling method can involve the user making a pronation/supination type of input gesture according to inertia control with unnatural scrolling, and with snap on. Scrolling may again simulate a tilted surface such that changing the hand's angle "tilts" the surface, causing the content of the scrollable lists 602, 702, 802 to slide in the corresponding direction. Another scrolling method may involve the user making a ring type of input gesture according to position control with natural scrolling, and with snap on.

That is, the user can move their finger in a rotational shape in a rotational shape, such as drawing a circle in the air. With ring-based position control, the list is displaced an amount proportional to how displaced the hand is clockwise or counter-clockwise from where it started. Since the user's hand can go around arbitrarily many times, grabbing or releasing the scrollable lists 602, 702, 802 is not necessary. Based on natural or unnatural scrolling, the direction of scrolling through the scrollable lists 602, 702, 802 can correspond to or be intuitively opposite to the ring-based hand rotation movement. Additionally or alternatively, the displacement of the scrollable lists 602, 702, 802 can be a function of the hand's rotational displacement. Also, unnatural scrolling can be turned on and snap can be turned off. Another scrolling method may involve the user making a flexion/extension type of input gesture according to a velocity nudge control method with stateless pinch. The velocity nudge control method may mean that the scrollable lists 602, 702, 802 are nudged by a discrete number of instances/items per nudge. For example, a pinch velocity nudge can cause the scrollable lists 602, 702, 802 to nudge up or down one time, although the nudges can be incremented by a different number such as two items per nudge, five items per nudge, and/or the like.

The user may flex or extend their hand in the pinch position to indicate the direction of the nudge. The user may also flex or extend their hand faster than a certain threshold without pinching. This action may be similar to waving the scrollable lists 602, 702, 802 along. The user may also use pronation/supination for the pinch-less velocity nudge such as based on nudging the scrollable lists 602, 702, 802 whenever the user rotates their hand faster than a certain amount in the corresponding direction. Another scrolling technique can involve the user making a flexion/extension type of pinch-less input gesture according to a displacement nudge control method with natural scrolling and with snap. This pinch-less displacement nudge may cause the scrollable lists 602, 702, 802 to nudge up or down by the specified nudge increment whenever the flex/extension angle of the user's hand exceeds a certain positive or negative threshold. Also, the user may use pronation/supination input gestures for a pinched displacement nudge with unnatural scrolling and snap. That is, each pinching motion can cause the scrollable lists 602, 702, 802 to be nudged up or down based on which way the wrist is rotated. Scrolling techniques and methods can be hybrids involving hybrids of the control methods discussed herein (e.g., flexion/extension, pronation/supination, deviation, etc.).

One hybrid scrolling method may involve the user using a flexion/extension type of input gesture according to hybrid control comprising rate control and no-pinch displacement nudge for more precise short-distance scrolling, which can result in a type of joystick type scrolling. As an example, this joystick scrolling may involve a "neutral zone" of angles close to 0, "nudge zones" on either side of that, and all angle values beyond the "nudge zone" as "scroll zones." If the user flexes/extends their hand into the nudge zone, this would cause the scrollable lists 602, 702, 802 to be nudged up or down by the specified increment and continue nudging by the increment per second or other specified delay as long as the user's hand is held in the nudge zone. If the hand is flexed/extended even further, the scrollable lists 602, 702, 802 may begin scrolling continuously with rate control. A similar joystick scrolling technique uses pronation/supination as the input technique. For example, this joystick scrolling may involve the user rotating their hand into the nudge zone and/or rotating even further past a threshold rotation to cause continuous scrolling with rate control.

Other joystick scrolling techniques may be implemented with stateless pinching. For example, the user may use flexion/extension as an input gesture with natural scrolling and snap with the neutral zone and the scroll zone described herein. Due to the stateless pinching configuration, the user would pinch to activate scrolling and pinch again to deactivate scrolling in the scroll zone. For example, the user can pinch to toggler scrolling from any zone. While scrolling, if the user flexes/extends their hand into the scroll zone, the scrollable lists 602, 702, 802 will nudge according to the specified nudge increment. If the user holds their hand in the scroll zone, the scrollable lists 602, 702, 802 may begin scrolling with rate control. Such a flexion/extension stateless joystick type scrolling technique can also be implemented with unnatural scrolling. As an example, for another joystick scrolling technique, every new user pinch motion may define a new center point. That is, the user briefly nudging their hand up or down after a pinch, and then returning it to center, will nudge the list once by the specified increment. Additionally, pinching, moving the hand, and holding the hand there can result in the scrollable lists 602, 702, 802 scrolling continuously in that direction until the hand returns to the point of the pinch (e.g., the new center point).

As an example, another joystick scrolling technique may enable the user to pinch in the nudge zone to move the list one unit in the appropriate direction. The user can pinch in the scroll zone to start scrolling the scrollable lists 602, 702, 802 with rate control until the user returns their hand to the center point. As an example, another joystick scrolling technique can enable the user to use a displacement nudge by pinching with the user's hand angled up or down to nudge the scrollable lists 602, 702, 802 up or down. Multiple pinches can be used to nudge the scrollable lists 602, 702, 802 multiple more times. After pinching, the user may angle the hand even further to start continuous scrolling of the scrollable lists 602, 702, 802 with rate control until the hand returns to where pinching started.

An alternative hybrid scrolling technique also uses flexion/extension as the input gesture with a neutral zone and scroll zones similar to described above and the use of stateful pinch and unnatural scrolling. Accordingly, the user may pinch in the scroll zone to cause the scrollable lists 602, 702, 802 to nudge by the specified increment. The user can hold a pinching motion to begin scrolling the scrollable lists 602, 702, 802 with rate control. Another hybrid scrolling technique applies a "drag and flick" hybrid control method, such as for efficient long-distance scrolling. The drag and flick control method may involve the user performing a flexion/extension type of input gesture according to position control with stateful pinch, natural scrolling, snap, and added flick functionality. As an example, with stateful pinch drag/flick, the user can pinch and hold to "grab" the scrollable lists 602, 702, 802 and drag it by changing the angle of their hand for position control.

If the hand is moving faster than a certain rate when the user releases, the scrollable lists 602, 702, 802 will not stop but instead keep moving at its previous speed, gradually slowing with simulated "friction" such as similar to or according to a specified transfer function. While the scrollable lists 602, 702, 802 are slowing down according to specified inertia (e.g., transfer function), the scrollable lists 602, 702, 802 can be grabbed again by the user such as with another pinch, which can imitate touchscreen type scrolling. Grabbing the scrollable lists 602, 702, 802 again while the scrollable lists 602, 702, 802 is moving with simulated friction can be based on a held pinch or another pinch, depending on whether stateful or stateless pinching settings are applied. In addition, the drag and flick navigation command can be performed based on a pronation/supination type of input gesture.

Figure 9:
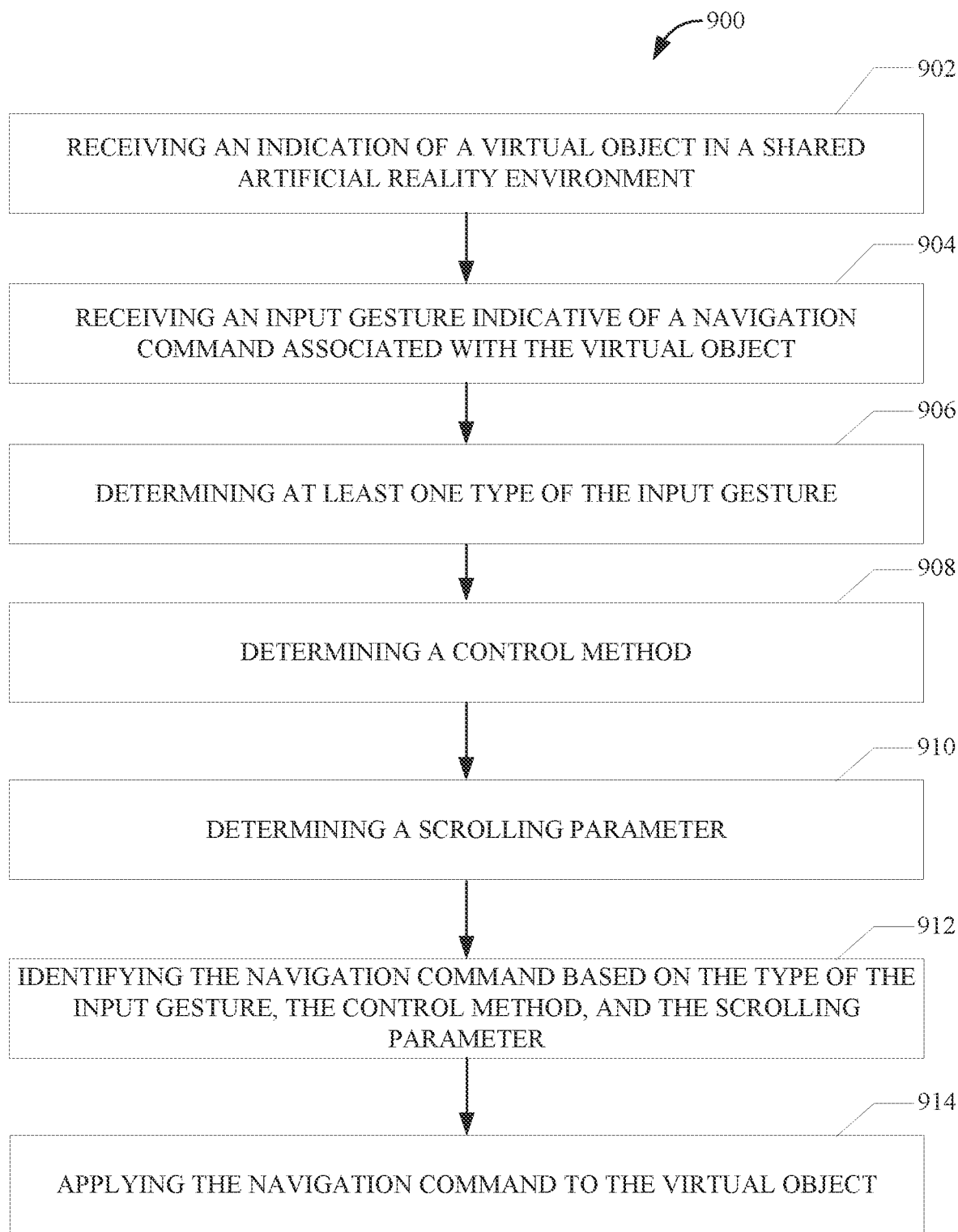
FIG. 9 is an example flow diagram for navigation through a shared artificial reality environment, according to certain aspects of the present disclosure.

FIG. 9 illustrates an example flow diagram (e.g., process 900) for navigating through a shared artificial reality environment in a shared artificial reality environment, according to certain aspects of the disclosure. For explanatory purposes, the example process 900 is described herein with reference to one or more of the figures above. Further for explanatory purposes, the steps of the example process 900 are described herein as occurring in serial, or linearly. However, multiple instances of the example process 900 may occur in parallel. For purposes of explanation of the subject technology, the process 900 will be discussed in reference to one or more of the figures above.

At step 902, an indication of a virtual object in the shared artificial reality environment may be received. According to an aspect, receiving the input gesture comprises sensing a hand motion by a wrist mounted sensor. For example, the virtual object comprises at least one of: a scrollable list, a scrollable object, a virtual area, or a highlighted virtual object. At step 904, an input gesture indicative of a navigation command associated with the virtual object may be received. For example, the first coordinate corresponds to a location of the user representation in the shared artificial reality environment. According to an aspect, sensing the hand motion comprises sensing a first motion by a first hand and a second motion by a second hand. The second motion comprises a modification of the input gesture triggered by the first motion. According to an aspect, sensing the hand motion comprises sensing a first motion by a first hand via the virtual interface for the navigation command and a second motion by a second hand via another virtual interface for another navigation command.

At step 906, at least one type of the input gesture may be determined. For example, the type of the input gesture comprises at least one of: flexion and extension, pronation and supination, or radial and ulnar. According to an aspect, determining the at least one type of the input gesture comprises comparing a sensed motion by a wrist mounted sensor with an optical signal from a head mounted sensor. At step 908, a control method may be determined. According to an aspect, determining the control method comprises determining at least one of: position control, rate control, or discrete nudge. At step 910, a scrolling parameter may be determined. According to an aspect, determining the scrolling parameter comprises determining at least one of: a pinch parameter, a natural scrolling parameter, a transfer function, a selection parameter, a dimensional parameter, a discrete parameter, a continuous parameter, a scrolling speed parameter, or a scrolling distance parameter. At step 912, a navigation command may be identified based on the type of the input gesture, the control method, and the scrolling parameter. According to an aspect, applying the navigation command comprises moving at least a portion of the virtual object based on a scrolling technique defined by the navigation command. The input gesture corresponds to a midair wrist movement.

At step 914, the navigation command can be applied to the virtual object. According to an aspect, the process 900 may further include determining a scrolling speed of the navigation command based on a speed or angle of wrist movement corresponding to the input gesture. According to an aspect, the process 900 may further include generating, based on the scrolling parameter, a momentum of scrolling through a scrollable list of the virtual object in the shared artificial reality environment according to the input gesture. According to an aspect, the process 900 may further include selecting an item of the scrollable list based on the navigation command and a double pinch input gesture.

Figure 10:
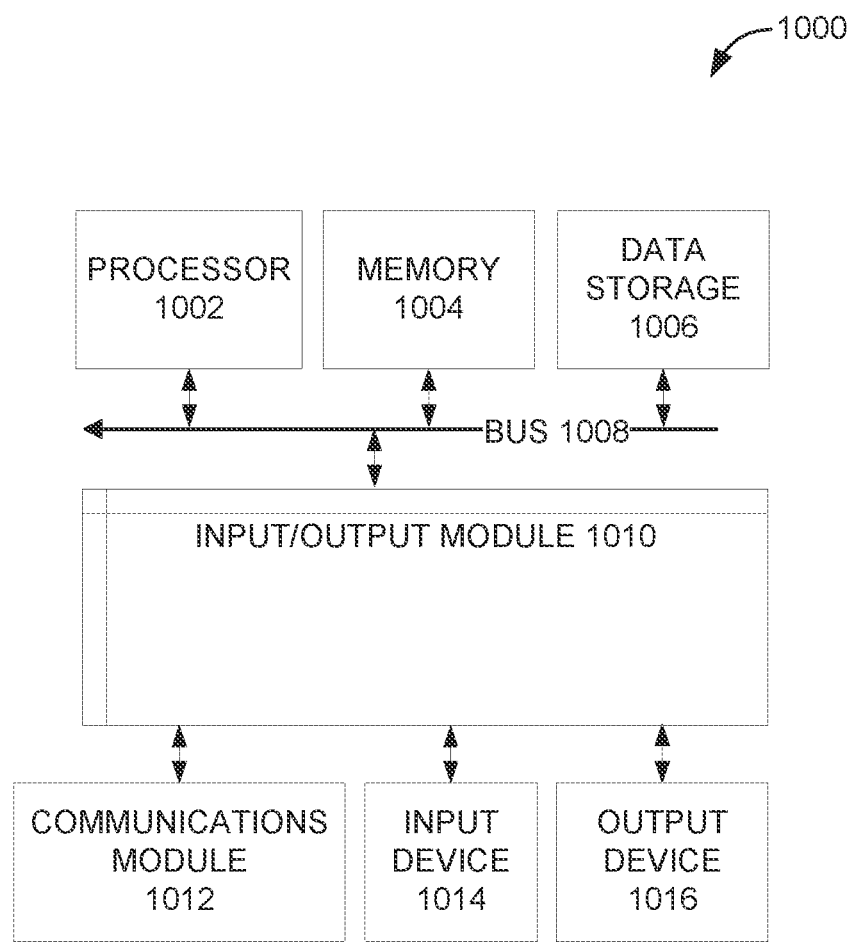
FIG. 10 is a block diagram illustrating an example computer system with which aspects of the subject technology can be implemented.

FIG. 10 is a block diagram illustrating an exemplary computer system 1000 with which aspects of the subject technology can be implemented. In certain aspects, the computer system 1000 may be implemented using hardware or a combination of software and hardware, either in a dedicated server, integrated into another entity, or distributed across multiple entities.

The computer system 1000 (e.g., server and/or client) includes a bus 1008 or other communication mechanism for communicating information, and a processor 1002 coupled with the bus 1008 for processing information. By way of example, the computer system 1000 may be implemented with one or more processors 1002. Each of the one or more processors 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by the processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 1000 further includes a data storage device 1006 such as a magnetic disk or optical disk, coupled to bus 1008 for storing information and instructions. The computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as an LCD (liquid crystal display) monitor, for displaying information to the user.

According to one aspect of the present disclosure, the above-described systems can be implemented using a computer system 1000 in response to the processor 1002 executing one or more sequences of one or more instructions contained in the memory 1004. Such instructions may be read into memory 1004 from another machine-readable medium, such as data storage device 1006. Execution of the sequences of instructions contained in the main memory 1004 causes the processor 1002 to perform the process steps described herein. One or more processors in a multi-processing arrangement may also be employed to execute the sequences of instructions contained in the memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 1000 can include clients and servers. A client and server are generally remote from each other and typically interact through a communication network. The relationship of client and server arises by virtue of computer programs running on the respective computers and having a client-server relationship to each other. The computer system 1000 can be, for example, and without limitation, a desktop computer, laptop computer, or tablet computer. The computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 1002 for execution. Such a medium may take many forms, including, but not limited to, non-volatile media, volatile media, and transmission media. Non-volatile media include, for example, optical or magnetic disks, such as the data storage device 1006. Volatile media include dynamic memory, such as the memory 1004. Transmission media include coaxial cables, copper wire, and fiber optics, including the wires that comprise the bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1000 reads XR data and provides an artificial reality, information may be read from the XR data and stored in a memory device, such as the memory 1004. Additionally, data from the memory 1004 servers accessed via a network, the bus 1008, or the data storage 1006 may be read and loaded into the memory 1004. Although data is described as being found in the memory 1004, it will be understood that data does not have to be stored in the memory 1004 and may be stored in other memory accessible to the processor 1002 or distributed among several media, such as the data storage 1006.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for navigating through a shared artificial reality environment, the method comprising:
   receiving an indication of a virtual object in the shared artificial reality environment;
   receiving, via a virtual interface, an input gesture indicative of a navigation command associated with the virtual object;
   determining at least one type of the input gesture, wherein the type of the input gesture comprises at least one of: flexion and extension, pronation and supination, or radial and ulnar wherein the at least one gesture is associated with an arrangement of zones such that each zone is bounded by at least one threshold,
   determining a control method, wherein the control method comprises at least one of: position control, rate control, or discrete nudge, and wherein determining the control method comprises:
   in response to exceeding the at least one threshold value associated with the input gesture, switching the control method from a first control method to a second control method;
   determining a scrolling parameter;
   identifying the navigation command based on the type of the input gesture, the control method, and the scrolling parameter; and
   applying the navigation command to the virtual object.

2. The computer-implemented method of claim 1, wherein receiving the input gesture comprises sensing a hand motion by a wrist mounted sensor, wherein the virtual object comprises at least one of: a scrollable list, a scrollable object, a virtual area, or a highlighted virtual object.

3. The computer-implemented method of claim 2, wherein sensing the hand motion comprises sensing a first motion by a first hand and a second motion by a second hand, wherein the second motion comprises a modification of the input gesture triggered by the first motion.

4. The computer-implemented method of claim 2, wherein sensing the hand motion comprises sensing a first motion by a first hand via the virtual interface for the navigation command and a second motion by a second hand via another virtual interface for another navigation command.

5. The computer-implemented method of claim 1, wherein determining the at least one type of the input gesture comprises comparing a sensed motion by a wrist mounted sensor with an optical signal from a head mounted sensor.

6. The computer-implemented method of claim 1, wherein determining the control method comprises determining at least one of: position control, rate control, or discrete nudge.

7. The computer-implemented method of claim 1, wherein determining the scrolling parameter comprises determining at least one of: a pinch parameter, a natural scrolling parameter, a transfer function, a selection parameter, a dimensional parameter, a discrete parameter, a continuous parameter, a scrolling speed parameter, or a scrolling distance parameter.

8. The computer-implemented method of claim 1, wherein applying the navigation command comprises moving at least a portion of the virtual object based on a scrolling technique defined by the navigation command, wherein the input gesture corresponds to a midair wrist movement.

9. The computer-implemented method of claim 1, further comprising:
generating, based on the scrolling parameter, a momentum of scrolling through a scrollable list of the virtual object in the shared artificial reality environment according to the input gesture; and
selecting an item of the scrollable list based on the navigation command and a double pinch input gesture.

10. The computer-implemented method of claim 1, further comprising determining a scrolling speed of the navigation command based on a speed or angle of wrist movement corresponding to the input gesture.

11. A system for navigating through a shared artificial reality environment, comprising:
one or more processors; and
a memory comprising instructions stored thereon, which when executed by the one or more processors, causes the one or more processors to perform:
receiving an indication of a virtual object in the shared artificial reality environment;
receiving, via a virtual interface, an input gesture indicative of a navigation command associated with the virtual object;
determining at least one type of the input gesture, wherein the type of the input gesture comprises at least one of: flexion and extension, pronation and supination, radial and ulnar, wherein the at least one gesture is associated with an arrangement of zones such that each zone is bounded by at least one threshold,
determining a control method, the control method comprises at least one of: position control, rate control, or discrete nudge, and wherein determining the control method further comprises:
in response to exceeding the at least one threshold value associated with input gesture, switching the control method from a first control method to a second control method;
determining a scrolling parameter;
identifying the navigation command based on the type of the input gesture, the control method, and the scrolling parameter;
applying the navigation command to the virtual object; and.

12. The system of claim 11, wherein the instructions that cause the one or more processors to perform receiving the input gesture cause the one or more processors to perform sensing a hand motion by a wrist mounted sensor, wherein the virtual object comprises at least one of: the scrollable list, a scrollable object, a virtual area, or a highlighted virtual object.

13. The system of claim 12, wherein the instructions that cause the one or more processors to perform sensing the hand motion cause the one or more processors to perform sensing a first motion by a first hand and a second motion by a second hand, wherein the second motion comprises a modification of the input gesture triggered by the first motion.

14. The system of claim 12, wherein the instructions that cause the one or more processors to perform sensing the hand motion cause the one or more processors to perform sensing a first motion by a first hand via the virtual interface for the navigation command and a second motion by a second hand via another virtual interface for another navigation command.

15. The system of claim 11, wherein the instructions that cause the one or more processors to perform determining the at least one type of the input gesture cause the one or more processors to perform comparing a sensed motion by a wrist mounted sensor with an optical signal from a head mounted sensor.

16. The system of claim 11, wherein the instructions that cause the one or more processors to perform determining the control method cause the one or more processors to perform determining at least one of: position control, rate control, or discrete nudge.

17. The system of claim 11, wherein the instructions that cause the one or more processors to perform determining the scrolling parameter cause the one or more processors to perform determining at least one of: a pinch parameter, a natural scrolling parameter, a transfer function, a selection parameter, a dimensional parameter, a discrete parameter, a continuous parameter, a scrolling speed parameter, or a scrolling distance parameter.

18. The system of claim 11, wherein the instructions that cause the one or more processors to perform applying the navigation command cause the one or more processors to perform moving at least a portion of the virtual object based on a scrolling technique defined by the navigation command, wherein the input gesture corresponds to a midair wrist movement.

19. The system of claim 11, further comprising stored sequences of instructions, which when executed by the one or more processors, cause the one or more processors to perform:
generating, based on the scrolling parameter, a momentum of scrolling through the scrollable list of the virtual object in the shared artificial reality environment according to the input gesture; and
determining a scrolling speed of the navigation command based on a speed or angle of wrist movement corresponding to the input gesture.

20. A non-transitory computer-readable storage medium comprising instructions stored thereon, which when executed by one or more processors, cause the one or more processors to perform operations for navigating through a shared artificial reality environment, comprising:
receiving an indication of a virtual object in the shared artificial reality environment;
receiving, via a virtual interface, an input gesture indicative of a navigation command associated with the virtual object;
determining at least one type of the input gesture, wherein the type of the input gesture comprises at least one of: flexion and extension, pronation and supination, radial and ulnar wherein the at least one gesture is associated with an arrangement of zones such that each zone is bounded by at least one threshold;
determining a control method, the control method comprises at least one of: position control, rate control, or discrete nudge, and wherein determining the control method further comprises in response to exceeding the at least one threshold value associated with the input gesture, switching the control method from a first control method to a second control method;
determining a scrolling parameter;
generating, based on the scrolling parameter, a momentum of scrolling through a scrollable list of the virtual object in the shared artificial reality environment according to the input gesture;

identifying the navigation command based on the type of the input gesture, the control method, and the scrolling parameter;

applying the navigation command to the virtual object; and.

\* \* \* \* \*